United States Patent
Kim et al.

(10) Patent No.: US 10,746,871 B2
(45) Date of Patent: Aug. 18, 2020

(54) ELECTRONIC DEVICE, CONTROL METHOD THEREOF AND RECORDING MEDIUM

(71) Applicant: Samsung Electronics Co., Ltd., Gyeonggi-do (KR)

(72) Inventors: Myung-Sik Kim, Gyeonggi-do (KR); Sung-Do Choi, Gyeonggi-do (KR); Dong-Churl Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 289 days.

(21) Appl. No.: 14/884,197

(22) Filed: Oct. 15, 2015

(65) Prior Publication Data
US 2016/0109573 A1    Apr. 21, 2016

(30) Foreign Application Priority Data
Oct. 15, 2014    (KR) .......................... 10-2014-0139236

(51) Int. Cl.
| | |
|---|---|
| *G01S 15/00* | (2020.01) |
| *G01S 15/42* | (2006.01) |
| *G01S 15/46* | (2006.01) |
| *G10K 11/34* | (2006.01) |
| *G06F 3/01* | (2006.01) |

(Continued)

(52) U.S. Cl.
CPC .............. *G01S 15/42* (2013.01); *G01S 7/539* (2013.01); *G01S 15/46* (2013.01); *G01S 15/878* (2013.01); *G06F 3/011* (2013.01); *G06F 3/017* (2013.01); *G10K 11/26* (2013.01); *G10K 11/346* (2013.01)

(58) Field of Classification Search
CPC ...................................................... G01S 15/42
See application file for complete search history.

(56) References Cited

U.S. PATENT DOCUMENTS

| | | | | | |
|---|---|---|---|---|---|
| 4,228,804 | A | * | 10/1980 | Holasek | ............. G01S 7/52036 600/443 |
| 5,886,452 | A | * | 3/1999 | Toda | ...................... G01B 7/004 178/18.04 |

(Continued)

FOREIGN PATENT DOCUMENTS

| | | |
|---|---|---|
| CN | 1183873 | 6/1998 |
| CN | 101690271 | 3/2010 |

(Continued)

OTHER PUBLICATIONS

Wikipedia, Signal, https://en.wikipedia.org/wiki/Signal, p. 1-8 (Year: 2004).*

(Continued)

*Primary Examiner* — Hovhannes Baghdasaryan
(74) *Attorney, Agent, or Firm* — The Farrell Law Firm, P.C.

(57) ABSTRACT

An electronic device, a method thereof, a non-transitory computer-readable recording medium, and a chipset are disclosed. The electronic device includes a sensor module including a plurality of sensor arrays for scanning a target object located in a predetermined vicinity of the electronic device; and a control module configured to determine a direction in which the target object is located, based on a first signal that the sensor module outputs with respect to the target object, and scan the target object located in the determined direction, wherein the sensor arrays are spaced apart from each other.

13 Claims, 29 Drawing Sheets

(51) Int. Cl.
*G01S 15/87* (2006.01)
*G01S 7/539* (2006.01)
*G10K 11/26* (2006.01)

(56) References Cited

U.S. PATENT DOCUMENTS

| | | | |
|---|---|---|---|
| 6,091,406 A * | 7/2000 | Kambara | G06F 3/0436 |
| | | | 345/177 |
| 6,690,363 B2 * | 2/2004 | Newton | G06F 3/0421 |
| | | | 178/18.01 |
| 7,248,344 B2 | 7/2007 | Morcom | |
| 2003/0002719 A1 | 1/2003 | Hamid et al. | |
| 2003/0202426 A1 * | 10/2003 | Ishihara | G01S 15/96 |
| | | | 367/103 |
| 2005/0237581 A1 | 10/2005 | Knighton et al. | |
| 2007/0159922 A1 * | 7/2007 | Zimmerman | G01S 7/52004 |
| | | | 367/103 |
| 2009/0005061 A1 | 1/2009 | Ward et al. | |
| 2009/0323121 A1 | 12/2009 | Valkenburg et al. | |
| 2010/0067330 A1 * | 3/2010 | Collier | G01S 7/524 |
| | | | 367/88 |
| 2010/0276583 A1 | 11/2010 | Senko | |
| 2010/0277339 A1 * | 11/2010 | Cyganski | G01S 1/026 |
| | | | 340/8.1 |
| 2010/0328431 A1 | 12/2010 | Kim et al. | |
| 2011/0144495 A1 * | 6/2011 | Wilkening | A61B 8/0883 |
| | | | 600/443 |
| 2011/0263983 A1 | 10/2011 | Peszynski | |
| 2011/0279682 A1 * | 11/2011 | Li | H04N 5/23245 |
| | | | 348/169 |
| 2012/0194483 A1 | 8/2012 | Deluca | |
| 2013/0016584 A1 * | 1/2013 | Zhou | G01S 15/8902 |
| | | | 367/88 |
| 2014/0031673 A1 | 1/2014 | Amemiya et al. | |
| 2015/0066439 A1 * | 3/2015 | Jones | G06F 17/50 |
| | | | 703/1 |
| 2015/0177866 A1 * | 6/2015 | Hwang | G06F 3/042 |
| | | | 345/175 |

FOREIGN PATENT DOCUMENTS

| | | |
|---|---|---|
| CN | 102264306 | 11/2011 |
| CN | 102804206 | 11/2012 |
| EP | 2 425 447 | 3/2012 |
| EP | 2 674 777 | 12/2013 |
| JP | 11-248821 | 9/1999 |
| JP | 2014-23670 | 2/2014 |
| KR | 10-0551803 | 2/2006 |
| WO | WO 2011/048433 | 4/2011 |
| WO | WO 2012/168322 | 12/2012 |
| WO | WO 2013/140130 | 9/2013 |

OTHER PUBLICATIONS

Sintes, Interferometric Side Scan Sonar : A Tool for High Resolution Sea Floor Exploration, Technical lessons learnt from the Erika incident and other oil spills—Brest, Mar. 13-16, 2002 (Year: 2002).*
International Search Report dated Jan. 26, 2016 issued in counterpart application No. PCT/KR2015/010896, 9 pages.
European Search Report dated Oct. 17, 2017 issued in counterpart application No. 15850927.3-1812, 8 pages.
Chinese Office Action dated Jul. 3, 2019 issued in counterpart application No. 201580056227.0, 26 pages.

* cited by examiner

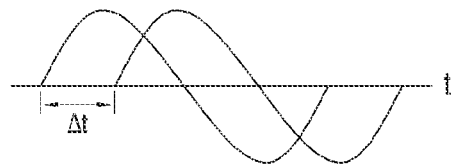
FIG.3B(1)
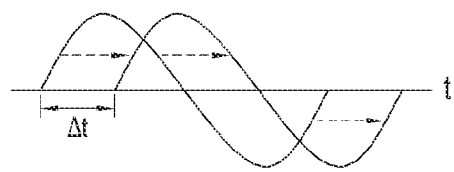
FIG.3B(2)
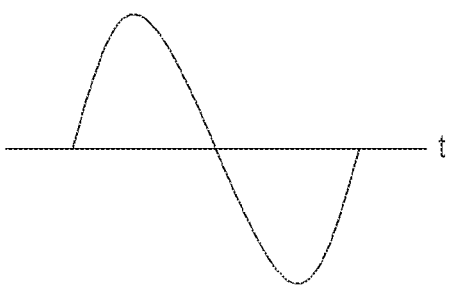
FIG.3B(3)

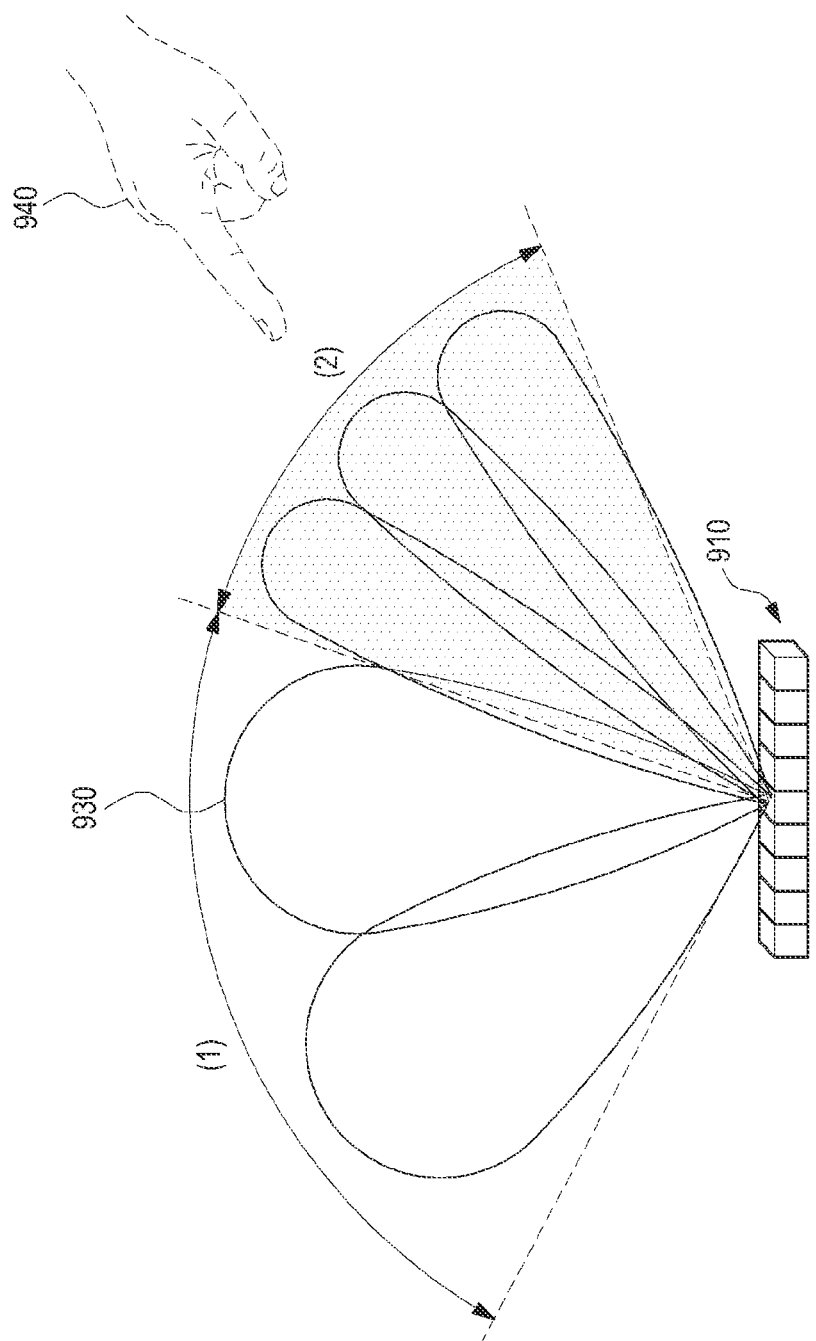

ELECTRONIC DEVICE, CONTROL METHOD THEREOF AND RECORDING MEDIUM

PRIORITY

This application claims priority under 35 U.S.C. § 119(a) to a Korean Patent Application filed on Oct. 15, 2014 in the Korean Intellectual Property Office and assigned Serial No. 10-2014-0139236, the entire disclosure of which is incorporated herein by reference.

BACKGROUND

1. Field of the Disclosure

The present disclosure relates generally to an electronic device, a control method thereof and a recording medium, and more particularly, to an electronic device, a control method, and a recording medium in which a transmitting side and a receiving side of a transducer array are disposed to be spaced apart from each other.

2. Description of the Related Art

In a case where a target object is scanned using an electronic device that includes a transmitting-side transducer array and a receiving-side transducer array, an ultrasonic beam in a range of several kilohertz (kHz) to hundreds of megahertz (MHz) may be output from the transmitting-side transducer array in order to scan the target object. The output ultrasonic beam may be propagated to the target object, and reflected toward the receiving-side transducer array. The reflected ultrasonic beam may vibrate the receiving-side transducer array, and the receiving-side transducer array may output an electrical pulse caused by the vibration. A direction in which the target object is located and a distance to the target object may be measured based on a direction in which the transmitting-side transducer array outputs a signal and a direction in which the receiving-side transducer array receives the output signal.

The transducer arrays for scanning the target object may be generally arranged to intersect in a right-angle shape or a cross shape. FIGS. 1A and 1B are illustrations, respectively, of a case where the transducer arrays are disposed in an electronic device such as a smart phone in a right-angle shape and a case where the transducer arrays are disposed in the electronic device in a cross shape. If the transducer arrays according to the prior art are in a right-angle shape, the arrangement structure of the transducer arrays may be limited as shown in FIG. 1A, or the arrangement of the transducer arrays may be impossible as shown in FIG. 1B.

SUMMARY

An aspect of the present disclosure is to provide an electronic device such as a smart phone in which a transmitting side and a receiving side of a transducer array are disposed to be spaced apart from each other.

Another aspect of the present disclosure is to provide a control method of an electronic device such as a smart phone in which a transmitting side and a receiving side of a transducer array are disposed to be spaced apart from each other.

Another aspect of the present disclosure is to provide an electronic device in which a transmitting-side transducer array and a receiving-side transducer array are disposed to be spaced apart from each other, to provide a scanned image having improved accuracy.

Another aspect of the present disclosure is to provide a control method of an electronic device in which a transmitting-side transducer array and a receiving-side transducer array are disposed to be spaced apart from each other, to provide a scanned image having improved accuracy.

Another aspect of the present disclosure is to provide an electronic device capable of improving the scanning speed.

Another aspect of the present disclosures is to provide a control method of an electronic device capable of improving the scanning speed.

In accordance with an aspect of the present disclosure, there is provided an electronic device. The electronic device includes a sensor module including a plurality of sensor arrays for scanning a target object located in a predetermined vicinity of the electronic device; and a control module configured to determine a direction in which the target object is located, based on a first signal that the sensor module outputs with respect to the target object, and scan the target object located in the determined direction, wherein the plurality of sensor arrays are spaced apart from each other.

In accordance with another aspect of the present disclosure, there is provided a method of an electronic device. The method includes outputting a first signal for determining a direction of a target object located in a predetermined vicinity of the electronic device, by a sensor module including a plurality of sensor arrays for determining a three-dimensional (3D) shape of the target object located in the predetermined vicinity of the electronic device; determining a direction in which the target object is located, based on the first signal that the sensor module outputs with respect to the target object; and determining the 3D shape of the target object located in the determined direction, wherein the plurality of sensor arrays are spaced apart from each other.

In accordance with another aspect of the present disclosure, there is provided a non-transitory computer-readable recording medium storing instructions configured to perform a method by a processor. The method includes outputting a first signal for determining a direction of a target object located in a predetermined vicinity of an electronic device, by a sensor module including a plurality of sensor arrays for determining a three-dimensional (3D) shape of the target object located in the predetermined vicinity of the electronic device; determining a direction in which the target object is located, based on the first signal that the sensor module outputs with respect to the target object; and determining the 3D shape of the target object located in the determined direction; wherein the plurality of sensor arrays are spaced apart from each other.

In accordance with another aspect of the present disclosure, there is provided a chipset. The chip set is configured to output a first signal for determining a direction of a target object located in a predetermined vicinity of the electronic device, by a sensor module including a plurality of sensor arrays for determining a three-dimensional (3D) shape of the target object located in the predetermined vicinity of the electronic device; determine a direction in which the target object is located, based on the first signal that the sensor module outputs with respect to the target object; and determine the 3D shape of the target object located in the determined direction; wherein the plurality of sensor arrays are spaced apart from each other.

BRIEF DESCRIPTION OF THE DRAWINGS

The above and other aspects, features and advantages of certain embodiments of the present disclosure will be more apparent from the following description, taken in conjunction with the accompanying drawings, in which:

FIGS. 3A to 3C are illustrations of a method of determining a direction of a reception beam that is received at a receiving-side transducer array in a deflected direction;

FIGS. 9A to 9F are illustrations of a method of, if a target object moves, a detailed scanning of an expected movement area in which the moving target object is expected to be located, to improve scanning speed according to an embodiment of the present disclosure;

DETAILED DESCRIPTION OF EMBODIMENTS OF THE PRESENT DISCLOSURE

Figure 1A:
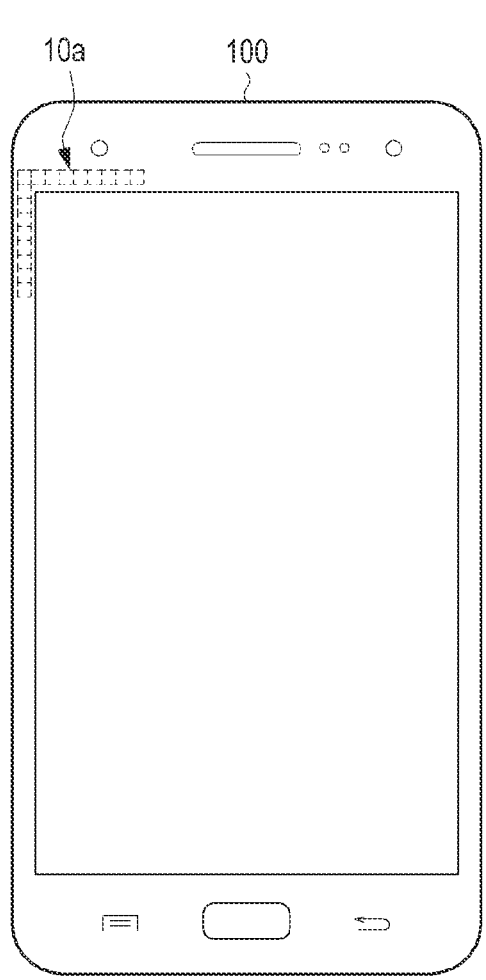
FIGS. 1A and 1B are illustrations of conventional transducer arrays disposed in an electronic device.

Hereinafter, embodiments of the present disclosure are described with reference to the accompanying drawings. Various modifications in the embodiments of the present disclosure may be made and various other embodiments are also possible, so certain embodiments are illustrated in the accompanying drawings and a detailed description thereof are given below. However, it should be appreciated that the present disclosure is not limited to the embodiments described in the present disclosure, and the present disclosure includes all changes and/or equivalents or replacements thereto that are within the scope of the appended claims and their equivalents. The same or similar reference denotations may be used to refer to the same or similar elements throughout the present disclosure and the accompanying drawings.

As used herein, the terms "have," "may have," "include," or "may include" indicate the existence of a feature (e.g., a number, function, method, or a component such as a part), but do not exclude the existence of other features.

As used herein, the phrases "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, and (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be referred to as a second component, and vice versa without departing from the scope and spirit of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a general-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe some embodiments of the present disclosure, but not to limit the scope of other embodiments of the present disclosure, it is to be understood that the singular forms "a," "any" and "the" include plural references unless the context clearly dictates otherwise. All terms including technical and scientific terms used herein have the same meanings as commonly understood by one of ordinary skill in the art to which an embodiment of the present disclosure belongs, it will be further understood that terms, such as those defined in commonly used dictionaries, should be interpreted as having meanings that are consistent with their meanings in the context of the relevant art and will not be interpreted in an idealized or overly formal sense unless expressly so defined herein.

An electronic device according to an embodiment of the present disclosure may be a device with a communication function. For example, an electronic device may include at least one of a smart phone, a tablet personal computer (PC), a mobile phone, a video phone, an electronic book (E-book) reader, a desktop PC, a laptop PC, a netbook computer, a personal digital assistant (PDA), a portable multimedia player (PMP), moving picture experts group audio layer 3 (MP3) player, a mobile medical device, a camera, or a wearable device (e.g., a head-mounted-device (ENID) such as electronic glasses, electronic clothing, an electronic bracelet, an electronic necklace, an electronic application (E-App) accessory (appcessory), an electronic tattoo, or a smart watch).

In an embodiment of the present disclosure, an electronic device may be a smart home appliance with a communication function. The smart home appliance may include at least one of, for example, a television (TV) set, a digital video disk (DVD) player, an audio player, a refrigerator, an air conditioner, a cleaner, an oven, a microwave oven, a washer, an air purifier, a set-top box, a TV box (e.g., Samsung HomeSync™ Apple TV™ or Google TV™), game consoles, an electronic dictionary, an electronic key, a camcorder, or an electronic photo frame.

In an embodiment of the present disclosure, an electronic device may include at least one of various medical devices (e.g., a magnetic resonance angiography (MRA) device, a magnetic resonance imaging (MRI) device, a computed tomography (CT) device, a medical camcorder, a medical ultrasound device and the like), a navigation device, a global positioning system (GPS) receiver, an event data recorder EDR), a flight data recorder (FDR), an automotive infotainment device, a marine electronic device (e.g., a marine navigation device, a gyro compass and the like), an avionics device, a security device, a car head unit, an industrial or household robot, an automated teller machine (ATM) for banks, or a point of sale (POS) device for shops.

In an embodiment of the present disclosure, an electronic device may include at least one of a part of furniture or a building/structure, an electronic board, an electronic signature receiving device, a projector, or various meters (e.g., meters for water, electricity, gas or radio waves), each of which includes a communication function. An electronic device according to an embodiment of the present disclosure may be one of the above-described devices, or a combination thereof. In addition, an electronic device according to an embodiment of the present disclosure may be a flexible device. Further, it will be apparent to those of ordinary skill in the art that an electronic device according to an embodiment of the present disclosure is not limited to the above-described devices.

An electronic device according to an embodiment of the present disclosure is described below with reference to the accompanying drawings. As used herein, the term "user" may refer to a person who uses an electronic device, or a device (e.g., an intelligence electronic device) that uses an electronic device.

Figure 2A:
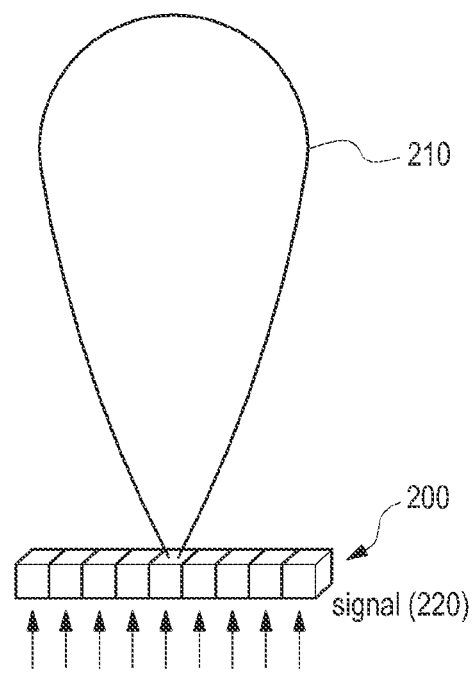
FIG. 2A is an illustration of a transmission beam which is output (or radiated) when transmission signals are input to a transmitting-side transducer array.

FIG. 2A is an illustration of a transmission beam that is output so as not to be deflected depending on signals being input to a transmitting side transducer array.

Referring to FIG. 2A, signals (hereinafter "transmission signals" as appropriate) 220 being input to transducers of a transducer array 200 that outputs a transmission beam 210 may be input to their associated transducers at the same time without a time delay, as illustrated in FIG. 2A. In this case, as illustrated in FIG. 2A, the transmission beam 210, which is not deflected to any one side, may be output.

Figure 2B:
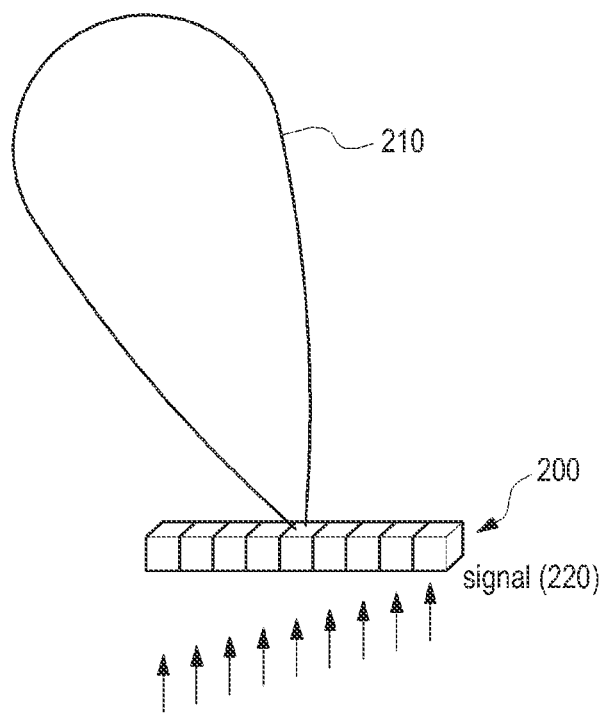
FIG. 2B is an illustration of a transmission beam which is output in a deflected manner due to a delay of transmission signals that are input to a transmitting-side transducer array.

FIG. 2B is an illustration of a transmission beam that is output in a deflected manner depending on signals being input to a transmitting-side transducer array.

Referring to FIG. 2B, unlike in FIG. 2A, the transmission signals 220 may be input to their associated transducers with a predetermined time delay. Due to the input of the transmission signals 220 which are input with a time delay, the transmission beam 210, which is deflected to one side as shown in FIG. 2B, may be output.

Although the transmission beam is shown on the plane (i.e., a two-dimensional (2D) view) in FIGS. 2A and 2B, this is for the purpose of description of the present disclosure, and a shape of the transmission beam that is output in a three-dimensional (3D) space may have a radiation pattern including, for example, a donut shape.

Figure 3A:
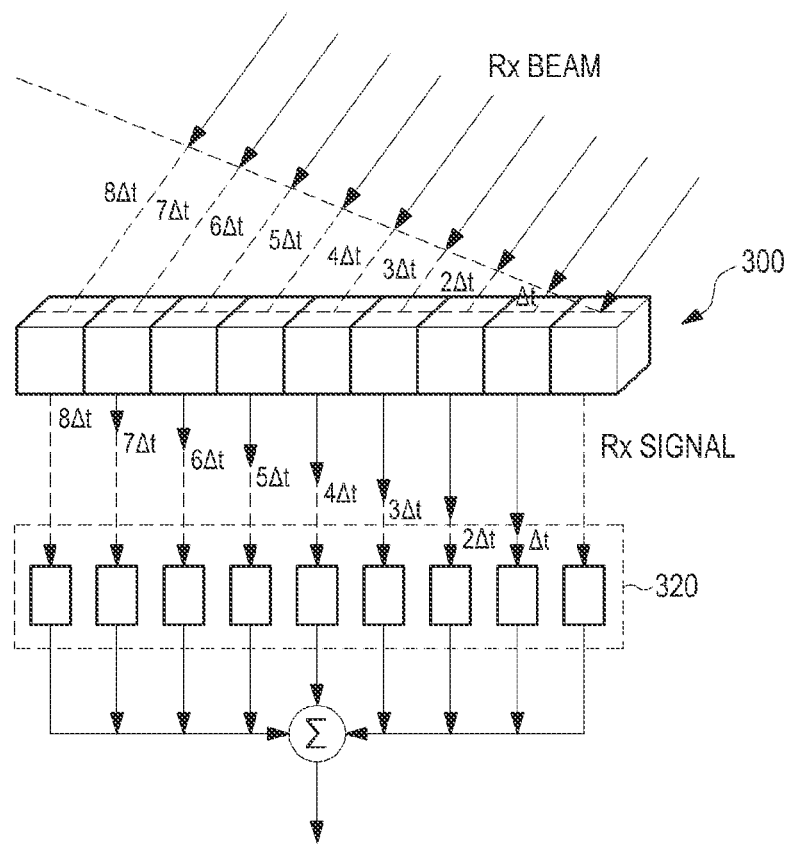
Figure 3C:
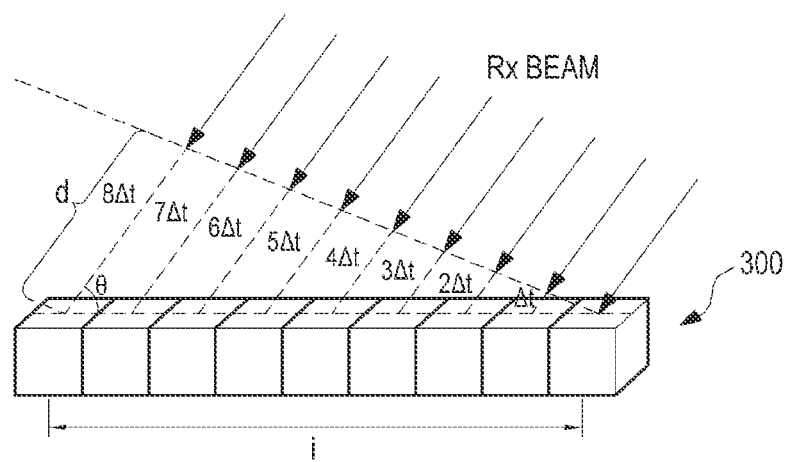

FIGS. 3A to 3C are illustrations of a method of determining a direction of a reception beam that is received at a receiving-side transducer array in a deflected direction.

Referring to FIG. 3A, a receiving-side transducer array 300 may detect a deflected reception beam. The deflected reception beam may be input to the receiving-side transducer array 300 with a predetermined time delay (e.g., $\Delta t$) as shown in FIG. 3A. Upon detecting the reception beam having a time delay, the receiving-side transducer array 300 may output reception signals corresponding to the reception beam. The output reception signals may be input to a delay circuit module 320. The time delay may be compensated for by the delay circuit module 320. Due to the compensation for the time delay by the delay circuit module 320, the reception signals may overlap each other, having the same phase. In the present disclosure, the transmission beam may be referred to as a "first signal," and the reception beam may be referred to as a "second signal."

Referring to FIG. 3B(1), as described above, the deflected reception signals detected by the receiving-side transducer array 300 may have a time delay (e.g., $\Delta t$). Referring to FIG. 3B(2), the time delay may be compensated for by the delay circuit module 320 in FIG. 3A, so the reception signals having time delay may have the same phase. The reception signals whose phases are the same may overlap each other as shown in FIG. 3B(3), and may be output as one signal. A control module may repeatedly perform overlapping for the reception signals having different time delay values. The control module may compare a magnitude of the overlapped reception signals with a predetermined threshold magnitude that is stored in advance. The magnitude of the overlapped reception signals may be determined based on, for example, the amplitude of the overlapped signals. The control module may calculate an incident angle (e.g., $\Phi$) for determining a direction of the detected reception beam based on the time delay of the reception signals whose magnitude exceeds (or is greater than or equal to) the threshold magnitude. A process in which the control module calculates the incident angle is illustrated in FIG. 3C.

Referring to FIG. 3C, a delay distance "d" corresponding to a time delay may be calculated as a product (e.g., $\delta \Delta t$) of the velocity "v" of the reception beam (e.g., ultrasonic waves) and the time delay (e.g. $d = v \times \Delta t$). After calculating the delay distance, the control module may calculate the incident angle based on the calculated delay distance and an arrangement distance "i" of the receiving-side transducer array 300 (e.g., cos θ=i/d). Based on the calculated incident angle, the control module may determine a direction of the received reception beam.

Figure 3D:
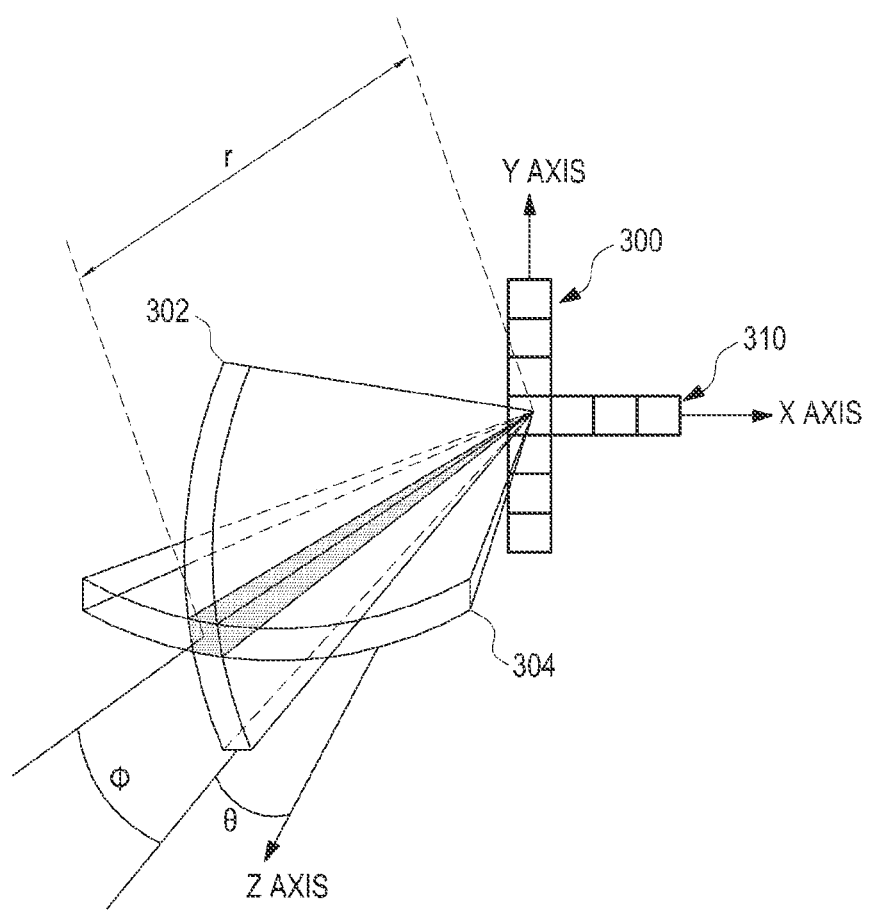
FIG. 3D is an illustration of a method in which a target object is scanned by transducer arrays that are disposed in an X-axis direction and a Y-axis direction, respectively.

FIG. 3D is an illustration of a method in which a target object is scanned by transducer arrays that are disposed in an X-axis direction and a Y-axis direction, respectively.

Referring to FIG. 3D, a transmitting-side transducer array 310 that is arranged in a first direction (e.g., the X-axis direction) may output a transmission beam 302 to scan the target object A reflected signal, which is provided when the output transmission beam returns to the electronic device after reflecting off of the target object, may be received by the receiving-side transducer array 300 that is arranged in a second direction (e.g., the Y-axis direction). In FIG. 3D, a transmission angle θ (on the Y-axis and Z-axis (Y-Z) plane) may indicate an angle at which the transmission beam 302 is output (e.g., a direction in which the transmission beam 302 is output). An incident angle Φ (on the X-Z plane) may indicate an angle at which a reception beam 304 is received (e.g., a direction in which the reception beam 304 is received). A distance "r" to the target object may be calculated by measuring a transmission/reception time T for the output direction of the transmission beam 302 and the reception direction of the reception beam 304, and multiplying T/2, which is a value obtained by dividing the transmission/reception time T by 2, by the velocity "v" of the transmission beam (or the reception beam). A shape of the target object may be determined based on r, θ and Φ.

Figure 4:
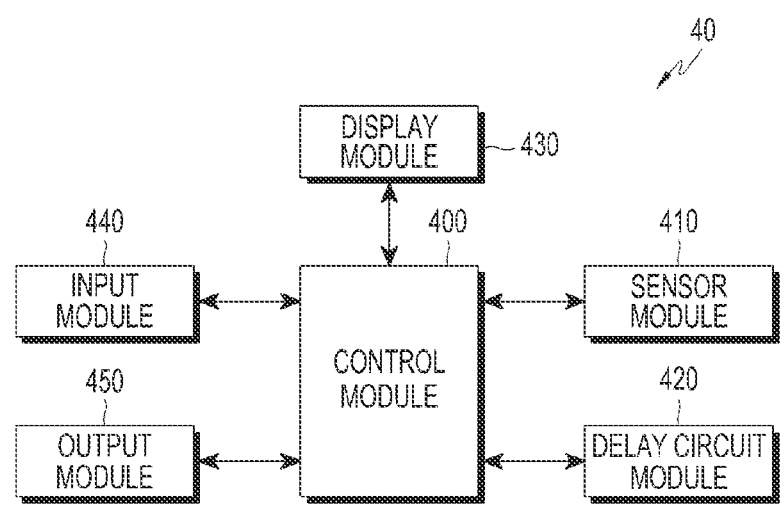
FIG. 4 is a block diagram of an electronic device according to an embodiment of the present disclosure.

FIG. 4 is a block diagram of an electronic device 40 according to an embodiment of the present disclosure.

Referring to FIG. 4, the electronic device 40 according to an embodiment of the present disclosure may include a control module 400, a sensor module 410, a delay circuit module 420, a display module 430, an input module 440 and an output module 450.

The control module 400 may receive a command from various components (e.g., the sensor module 410, the delay circuit module 420, the display module 430, the input module 440, the output module 450, and the like) of the electronic device 40 through, for example, a bus, decrypt the received command, and perform an operation or process data corresponding to the decrypted command.

The control module 400 may determine a location of a target object based on a signal that is transmitted or received by the sensor module 410, and scan a target object. For reference, the term "scan" as used herein may refer to various functions or operations that are performed to acquire a 3D shape of a target object.

The control module 400 may determine a location of a target object based on a direction of a signal that is output by a first sensor array included in the sensor module 410 and a direction of a signal that is received by a second sensor array included in the sensor module 410. Although a signal output by the first sensor array and a signal received by the second sensor array may be ultrasonic waves, the signals are not limited thereto. The first sensor array may indicate a transmitting-side transducer array, and the second sensor array may indicate a receiving-side transducer array. A direction of the first sensor array may be determined by a transmission angle θ, and a direction of the second sensor array may be determined by an incident angle Φ.

In addition, the control module 400 may determine a distance to a target object based on a time in which the signal output by the first sensor array returns to the first sensor array after reflecting off of the target object, and a time in which the signal arrives at the second sensor array after reflecting off of the target object.

Further, the control module 400 may determine an expected movement location of a target object using a location prediction algorithm, and set the determined expected movement location to be included in a detailed scan area.

In addition, the control module 400 may determine a location of a target object using triangulation based on the distance to the target object sensed by the first sensor array and the second sensor array, and set the determined location to be included in the detailed scan area.

Moreover, the sensor module 410 may include transducer arrays. The transducer arrays may include, for example, a first transducer array (e.g., a first transducer array 510 in FIG. 5A) for outputting a transmission beam and a second transducer array (e.g., a second transducer array 520 in FIG. 5A) that detects a reception beam and outputs a reception signal corresponding to the reception beam. The first transducer array may be arranged in a first direction, and the second transducer array may be arranged in a second direction. The first direction may indicate the X-axis direction including a predetermined error range on the basis of a 2D Cartesian coordinate system, and the second direction may indicate the Y-axis direction including a predetermined error range on the basis of a 2D Cartesian coordinate system. An angle made by the first direction and the second direction is not limited to a right angle unless the first direction and the second direction are perpendicular to each other. The control module 400 may determine an output direction of a transmission beam, and may determine a direction in which a reception beam is detected, based on an output reception signal. The first transducer array and the second transducer array may be disposed in the electronic device 40 to be spaced apart from each other. The first transducer array may be disposed in the predetermined vicinity of, for example, the input module 440. The input module 440 may include, for example, a volume control button that is disposed on a side of the electronic device 40. The second transducer array may be disposed in the predetermined vicinity of the output module 450. The output module 450 may include a speaker module that is disposed on the front of the electronic device 40.

The delay circuit module 420 may perform a function or an operation of matching a phase difference of reception signals having different phases. After delaying the reception signals, the delay circuit module 420 may overlap the signals whose phases are the same, into one signal, and output the overlapped signal. In addition, the delay circuit module 420 may control the direction of the output transmission beam by delaying the signals (e.g., transmission signals 220) for outputting the transmission beam so as to have a predetermined time delay value, at the time of outputting the signals.

The display module 430 may display a variety of information (e.g., multimedia data, text data, or the like), for the user. In one embodiment of the present disclosure, the display module 430 may include a touch screen. If the display module 430 includes the touch screen, some of the function/functions or operation/operations performed by the input module 440 may be performed by the touch screen.

The input module 440 may be configured to receive a predetermined command or data from a user through various input/output devices (e.g., a keyboard, a touch key, a physical key, and the like). The input module 440 may transfer the received various commands or data to the control module 400.

The output module 450 may output a variety of information to provide the information to a user. The output module 450 may include, for example, a speaker module. According to an embodiment of the present disclosure, the output module 450 may include the function/functions or operation/operations of the display module 430.

Figure 5A:
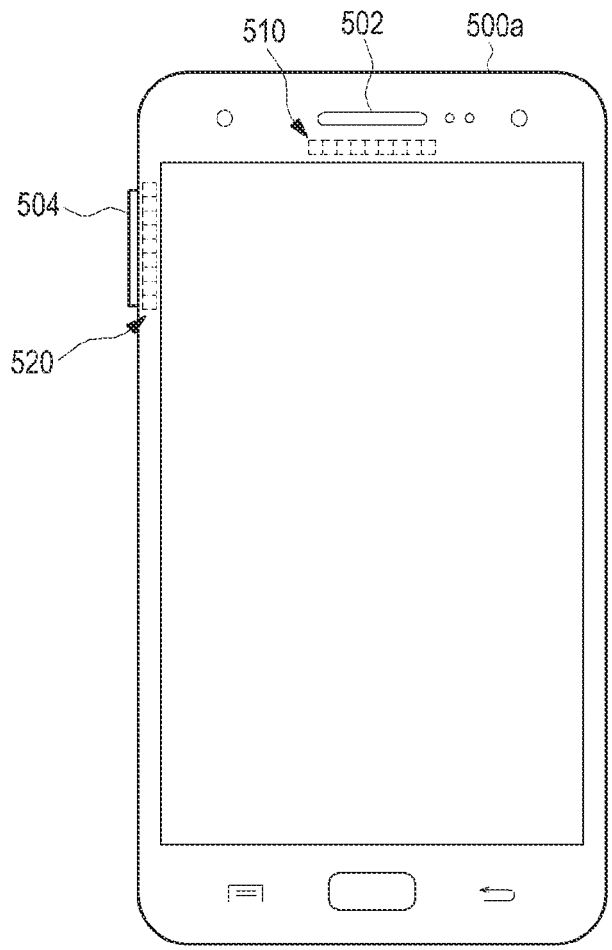
FIGS. 5A to 5C are illustrations in which transducer arrays are disposed in an electronic device according to an embodiment of the present disclosure.
Figure 5B:
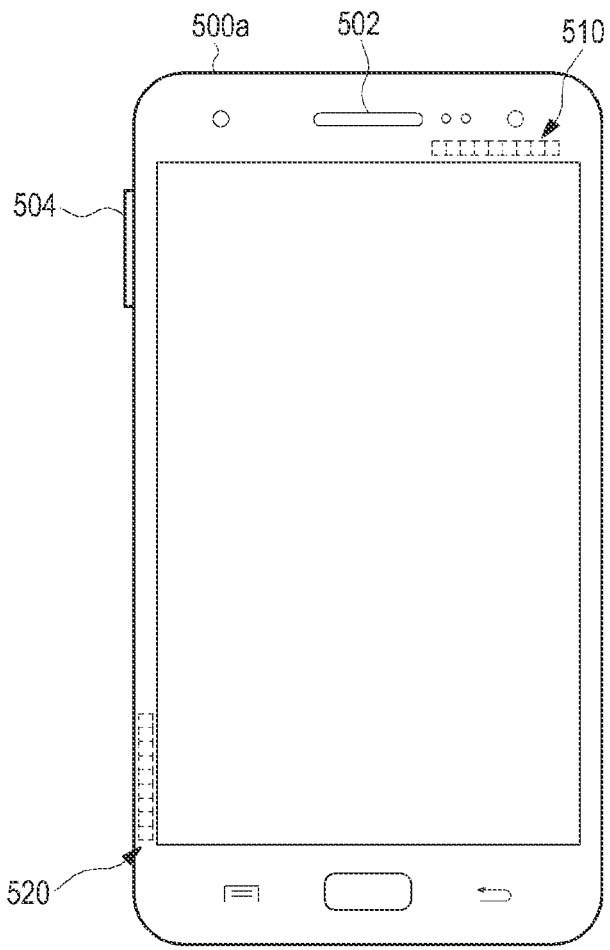
Figure 5C:
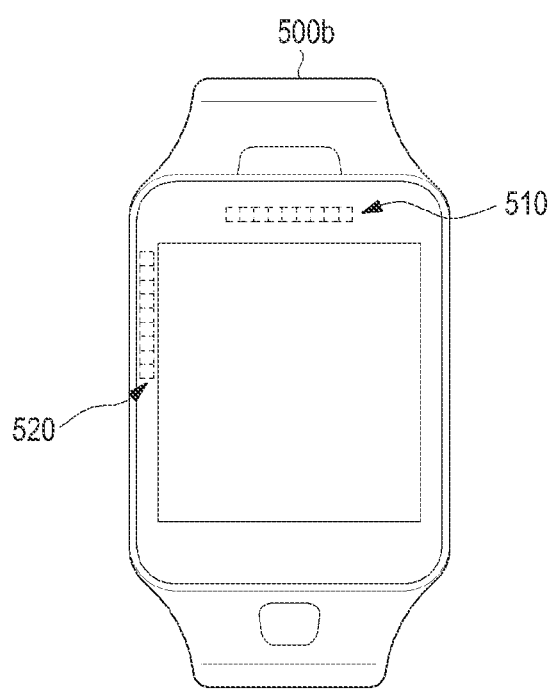

FIGS. 5A to 5C are illustrations in which transducer arrays are disposed in an electronic device according an embodiment of the present disclosure.

Referring to FIG. 5A, the first transducer array 510 may be disposed in an output module (e.g., a speaker module 502), and the second transducer array 520 may be disposed in the predetermined vicinity of an input module (e.g., a side button 504). However, the embodiment of the present disclosure shown in FIG. 5A is merely an example, the present disclosure is not limited thereto, and the first transducer array 510 and the second transducer array 520 may be disposed in various locations on an electronic device 500a as shown in FIG. 5B.

Referring to FIG. 5C, the first transducer array 510 and the second transducer array 520 may be disposed in a wearable electronic device 500b as another example of an electronic device. As illustrated in FIG. 5C, the first transducer array 510 and the second transducer array 520 may be disposed on the front of the wearable electronic device 500b so as to be spaced apart from each other.

The embodiments of electronic devices 500a and 500b of the present disclosure illustrated in FIGS. 5A to 5C are merely examples; the present disclosure is not limited thereto. The first transducer array 510 and the second transducer array 520 may be applied to various other electronic devices according to various embodiments of the present disclosure, such as, for example, a tablet PC, an E-book reader and a desktop PC.

Figure 6:
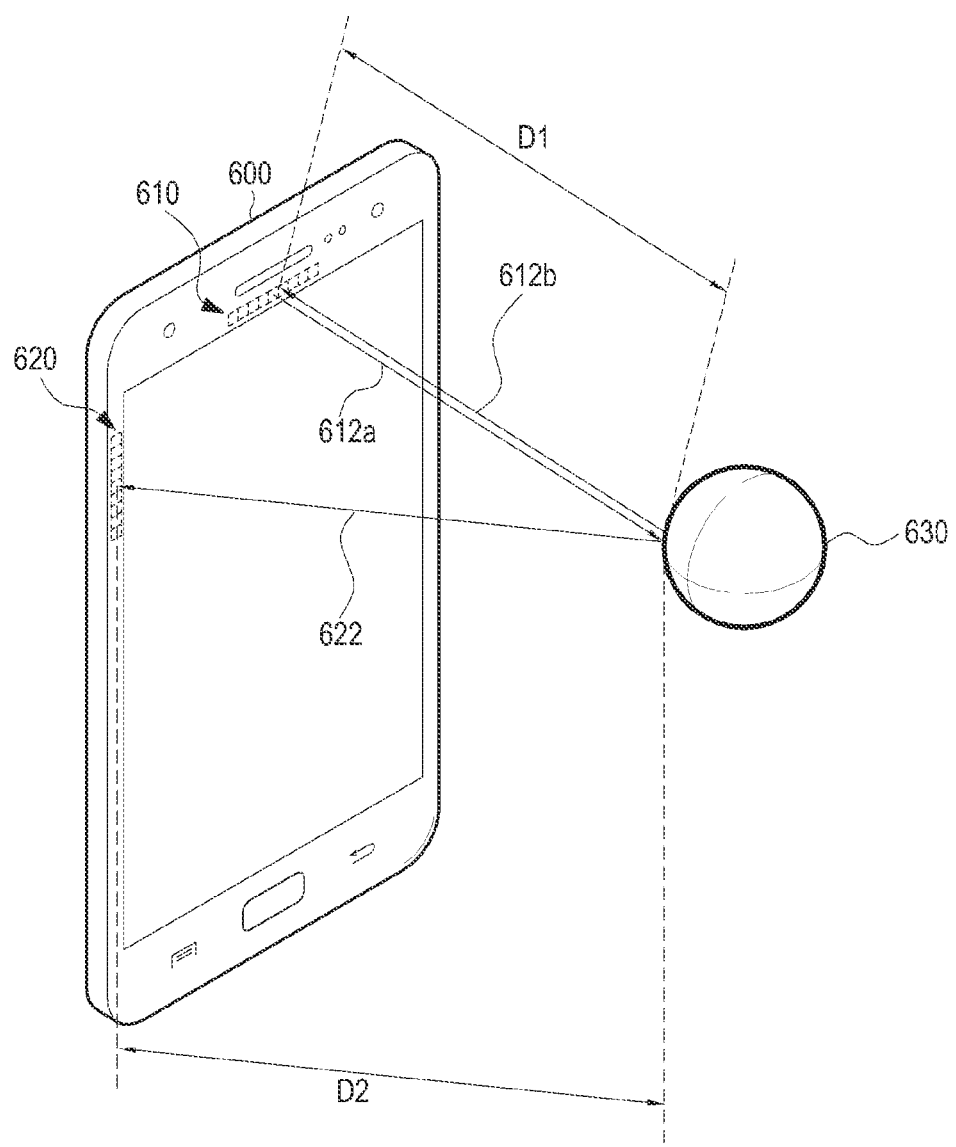
FIG. 6 is an illustration of a method of detecting distances D1 and D2 for determining a location of a target object by transducer arrays according to an embodiment of the present disclosure.

FIG. 6 is an illustration of a method of detecting distances D1 and D2 for determining a location of a target object by transducer arrays according to an embodiment of the present disclosure.

Referring to FIG. 6, a first transducer array 610 may output a transmission beam 612a, and a second transducer array 620 may detect a reception beam 622, which is provided when the output transmission beam 612a returns after being reflected off of a target object 630. A control module (e.g., the control module 400 in FIG. 4) may calculate a distance to the target object 630 based on the time of flight (ToF) in which the electronic device 600 receives the reception beam 622 after transmitting the transmission beam 612a. In a case where two transducer arrays 310 and 300 are disposed to intersect each other as illustrated in FIG. 3D, since the transmission location and the reception location are the same, a distance from the transducer arrays 310 and 300 to the target object 630 may be calculated by multiplying ToF/2, which is a value defined by dividing ToF by 2, by the velocity (e.g., the velocity "v" of the transmission beam or the reception beam) of the ultrasonic waves. However, in a case where the transmitting-side transducer array 610 and the receiving-side transducer array 620 are disposed to be spaced apart from each other as shown in FIG. 6, the distances D1 and D2 to the target object 630 may be calculated as described below.

The transmission beam 612a output by the first transducer array 610 may be reflected toward the second transducer array 620 upon its arrival at the target object 630. The second transducer array 620 may detect the reflected transmission beam 612a. The first transducer array 610 may also detect a beam 612b that is reflected off of the target object 630, by switching to the reception mode after outputting the transmission beam 612a (in the transmission mode). The control module 400 of FIG. 4 may calculate a ToF value of the transmission beam 612a output by the first transducer array 610, through the transmission mode and the reception mode of the first transducer array 610. The control module 400 may calculate a distance D1 from the first transducer array 610 to the target object 630 based on the calculated ToF value and the velocity of the output transmission beam 612a. In addition, the control module 400 may calculate a distance D2 between the target object 630 and the second transducer array 620, based on (i) a time in which the transmission beam 612a output from the first transducer array 610 arrives at the second transducer array 620 after being reflected off of the target object 630, (ii) the ToF value, and (iii) the velocity of the transmission beam. By accurately determining the distance to the target object 630 through an operation of calculating the distances between the target object 630 and the transducer arrays 610 and 620, the control module 400 may accurately calculate the distance from each of the transducer arrays being spaced apart from each other, to the target object 630.

FIGS. 7A to 7D are illustrations for comparing a case where a target object is scanned based on distances D1 and D2 and a case where a target object is scanned not based on the distances D1 and D2 according to an embodiment of the present disclosure.

Figure 1B:
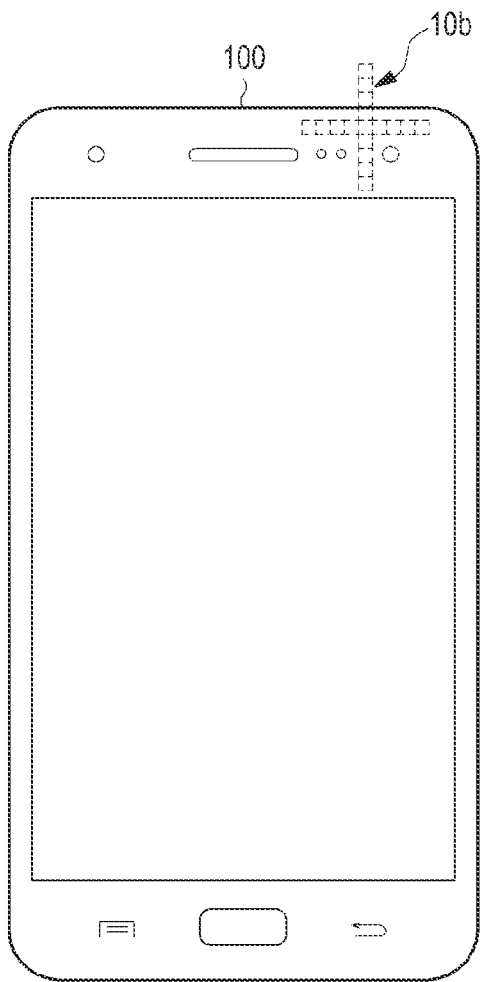
Figure 7A:
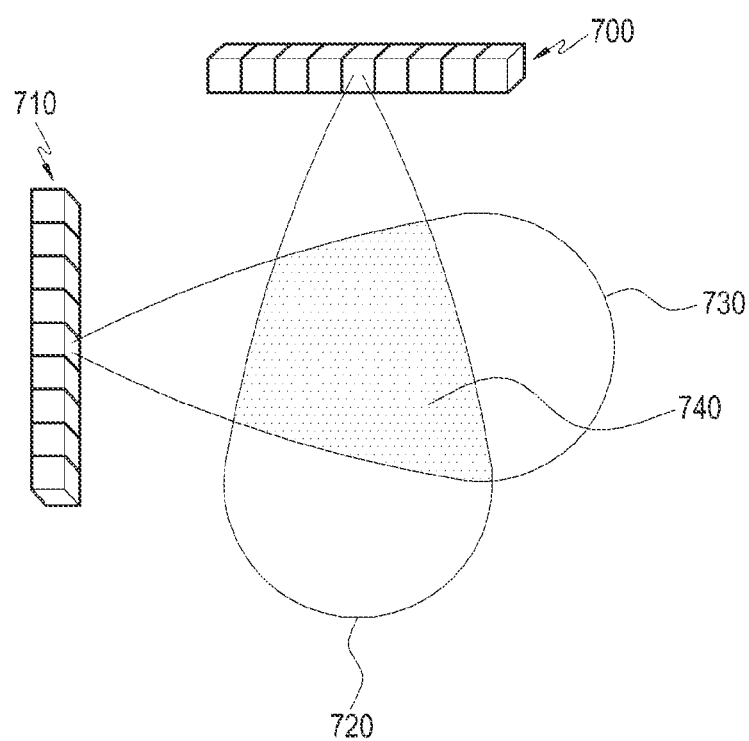
FIGS. 7A to 7D are illustrations for comparing a case where a target object is scanned based on distances D1 and D2 and a case where a target object is scanned not based on the distances D1 and D2 according to an embodiment of the present disclosure.

Referring to FIG. 7A, even though a first transducer array 700 and a second transducer array 710 are disposed to be spaced apart from each other in FIG. 7A, scanning may be performed not based on the distances D1 and D2. In FIGS. 7A to 7D, patterns of a transmission beam 720 and a reception beam 730 are illustrated on a plane (e.g. a 2D view), for convenience of description. An area where the transmission beam 720 and the reception beam 730 cross each other may be a plane having a predetermined area. In this case, where two transducer arrays cross each other as shown in FIGS. 1A and 1B, since a transmission reference point of a transmission beam is the same as a reception reference point where the reflected transmission beam is received, a distance where the target object exists within a scan range may be a distance corresponding to the time T/2, which is obtained by dividing, by 2, the time T in which the signal output from the first transducer array 700 is received at the second transducer array 710. However, in a case where the transducer arrays 700 and 710 are spaced apart from each other according to an embodiment of the present disclosure, if a distance to the target object is calculated by simply dividing the transmission/reception time T by 2, the control module may incorrectly determine the location where the transmission beam is actually reflected off of the target object, in a case where the target object is located to be deflected toward any one transducer array, thereby causing a decrease in the scanning accuracy.

Figure 7B:
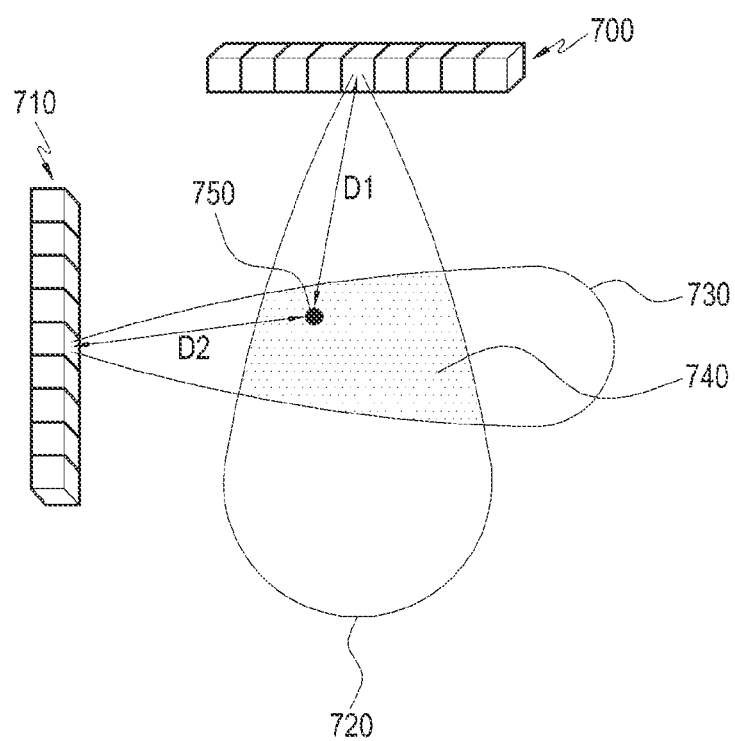

However, in a case where the location where the transmission beam 720 is reflected is determined based on the calculated distances D1 and D2 as illustrated in FIG. 7B, the point where the target object is located may be accurately determined in the area where the transmission beam 720 and the reception beam 730 overlap each other, contributing to an increase in accuracy. The area may correspond to a point, at which the target object is located and the transmission beam is reflected, and may be referred to as a "reflection area."

Figure 7C:
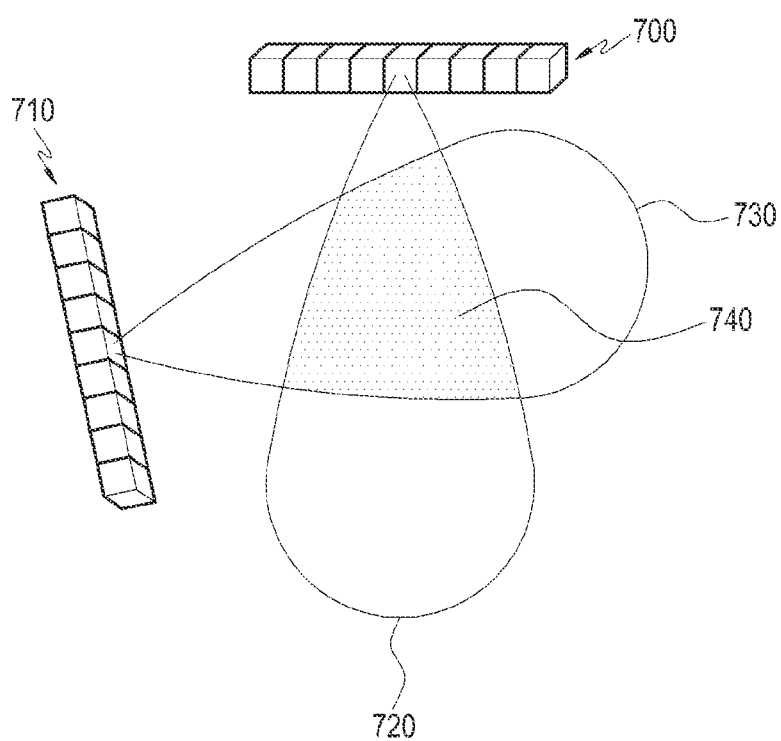

Referring to FIG. 7C, though the first transducer array 700 and the second transducer array 710 are disposed to be spaced apart from each other, the angle made by the first transducer array 700 and the second transducer array 710 may not be a right angle. In this case, an area 740 where the transmission beam 720 and the reception beam 730 overlap each other may be deflected, unlike the case where the angle made by the first transducer array 700 and the second transducer array 710 is a right angle, so the reflection area may be extended to one side, causing distortion. As a result, there is a possibility that an error in one direction may increase.

Figure 7D:
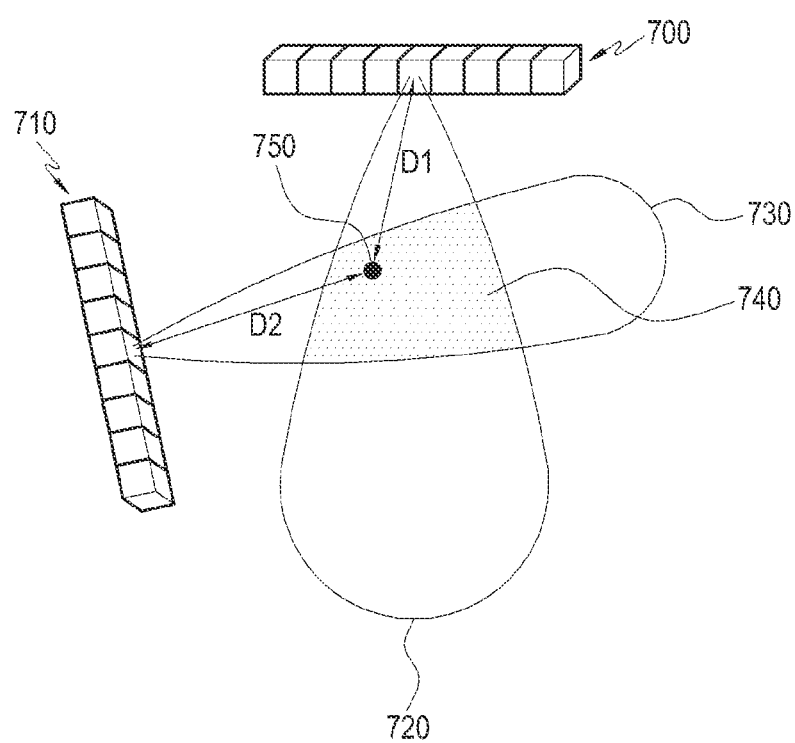

However, if scanning is performed based on calculated distances D1 and D2 as illustrated in FIG. 7D, the control module may accurately determine a point where the target object is located, even in a case where the angle made by the first transducer array 700 and the second transducer array 710 is not a right angle. Thus, it is possible to relatively reduce the size of an area where the transmission beam 720 and the reception beam 730 overlap each other, thereby contributing to the improvement of scanning accuracy.

FIGS. 8A to 8E are illustrations of a method of setting a locatable area of a target object based on distances D1 and D2 according to an embodiment of the present disclosure before performing scanning for the target object, and scanning only the locatable area to improve scanning speed.

Figure 8A:
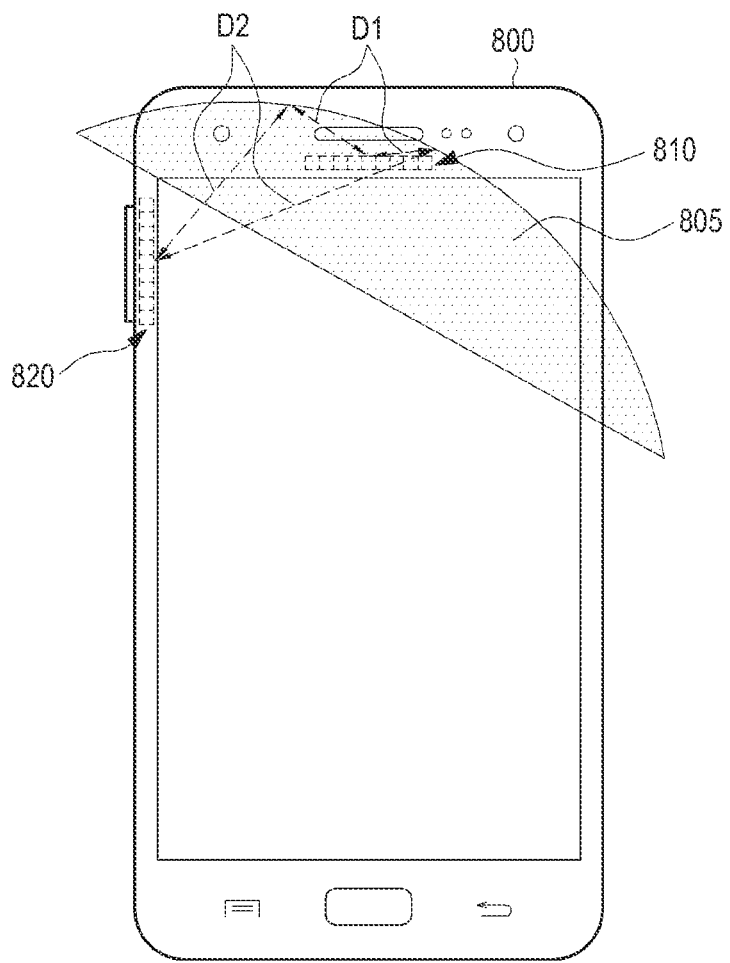
FIGS. 8A to 8E are illustrations of a method of setting a locatable area of a target object based on distances D1 and D2 according to an embodiment of the present disclosure before performing scanning for the target object, and scanning only the locatable area to improve scanning speed.
Figure 8B:
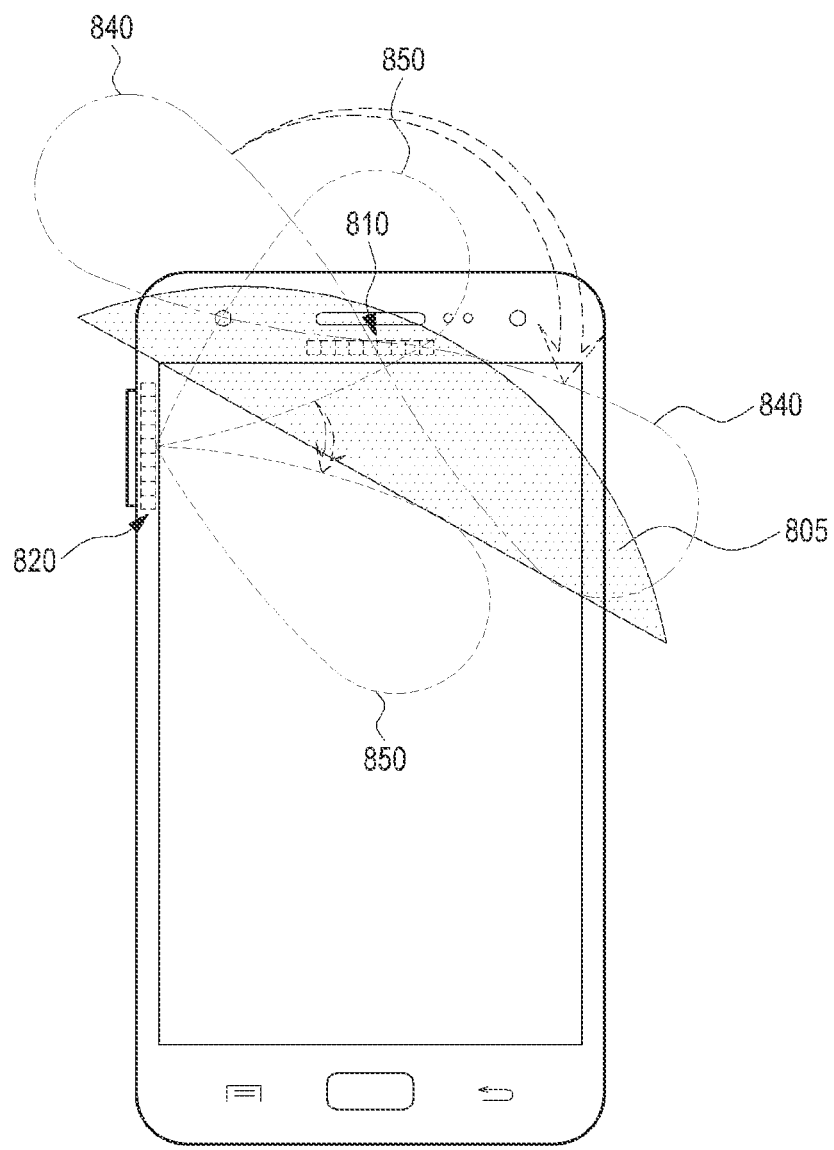

Referring to FIG. 8A, the control module 400 of FIG. 4 may set a locatable area 805 of a target object based on calculated distances D1 and D2. The locatable area 805, in which the target object can be located, may be calculated based on only the calculated distances D1 and D2 (using, for example, triangulation). In the 3D space, two points (e.g., coordinates corresponding to the first transducer array 610 and the second transducer array 620 of FIG. 6) and the distances D1 and D2 from the points to an arbitrary point are known, so the locatable area 805 of the target object may be determined as a shape of a circle that is generated when spheres having, as radiuses, the measured distances D1 and D2 from the transducer arrays 610 and 620 cross each other in the 3D space. In FIG. 8A, for convenience of description, the shape of a circle is illustrated on a plane perpendicular to the plane that is formed by the electronic device 800. Accordingly, as illustrated in FIG. 8B, scanning for the target object may be performed only for the locatable area 805, so a time required to perform the scanning can be reduced.

Figure 8C:
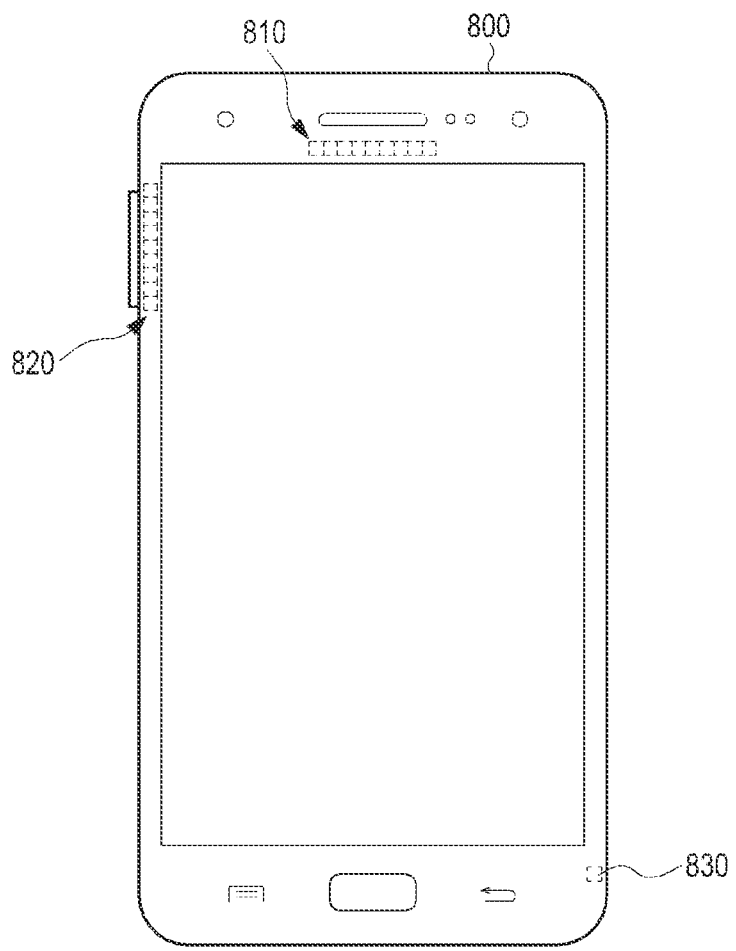
Figure 8D:
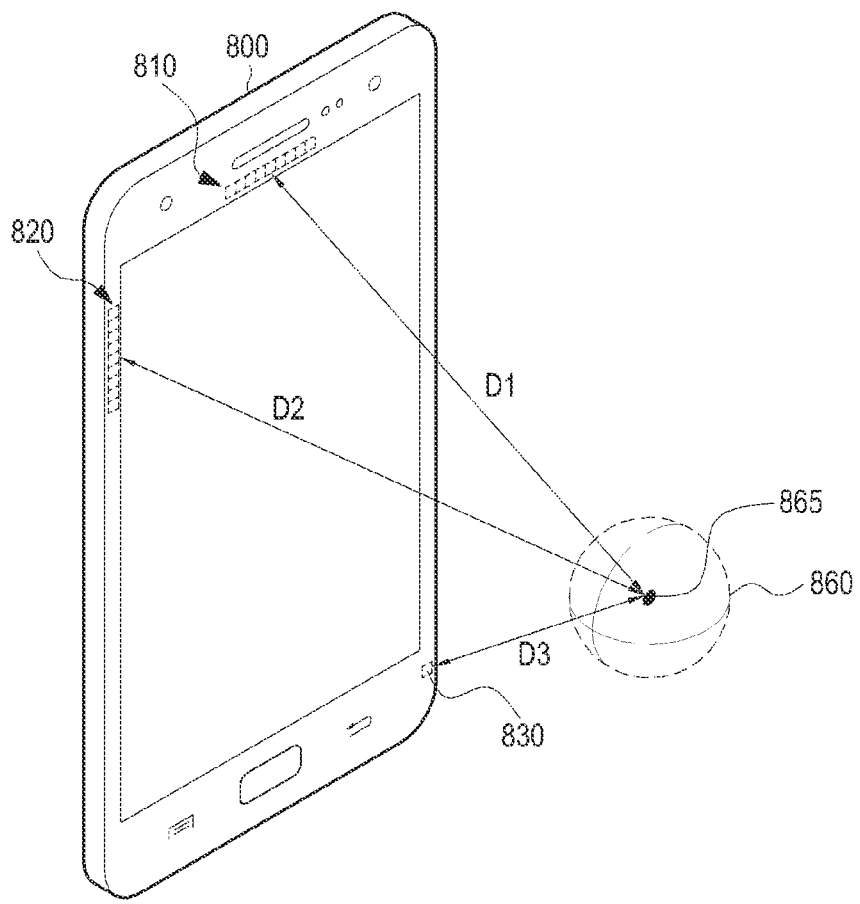
Figure 8E:
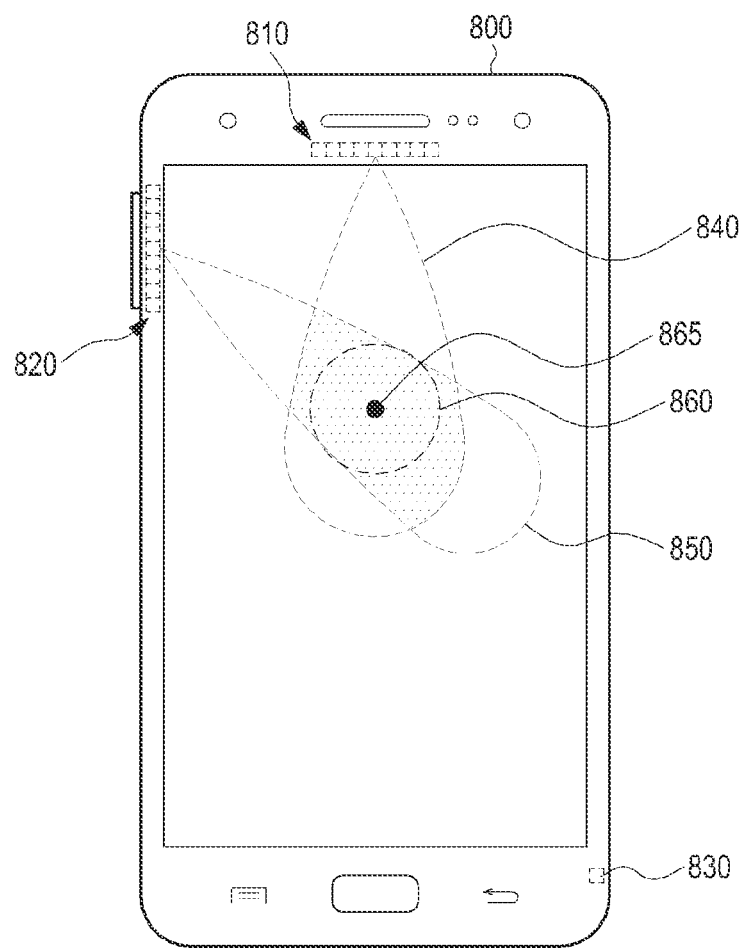

Referring to FIG. 8C, the electronic device 800 according to an embodiment of the present disclosure may include a third transducer 830 in addition to a first transducer array 810 and a second transducer array 820. In the case of FIG. 8C, distances from three points may be determined using the third transducer 830. Thus, as illustrated in FIG. 8D, it is possible to determine an approximate candidate location 865 where a target object is located in the space. In addition, the control module 400 of FIG. 4 may determine a candidate area 860 based on the candidate location 865. Referring to FIG. SE, the control module 400 may control the first transducer array 810 and the second transducer array 820 to scan only the surroundings of the candidate area 860 on the basis of the candidate area 860, making it possible to scan only a limited scan area, thereby contributing to an improvement of scanning speed. Even in FIG. BE, for convenience of description, the candidate area 860 is illustrated on the plane. The candidate area 860 may be determined in the form of a sphere in, for example, a 3D space.

FIGS. 9A to 9F are illustrations of a method of, if a target object moves, a detailed scanning of an expected movement area (e.g. a scan to a first predetermined level of detail) in which the moving target object is expected to be located, to improve scanning speed.

Figure 9A:
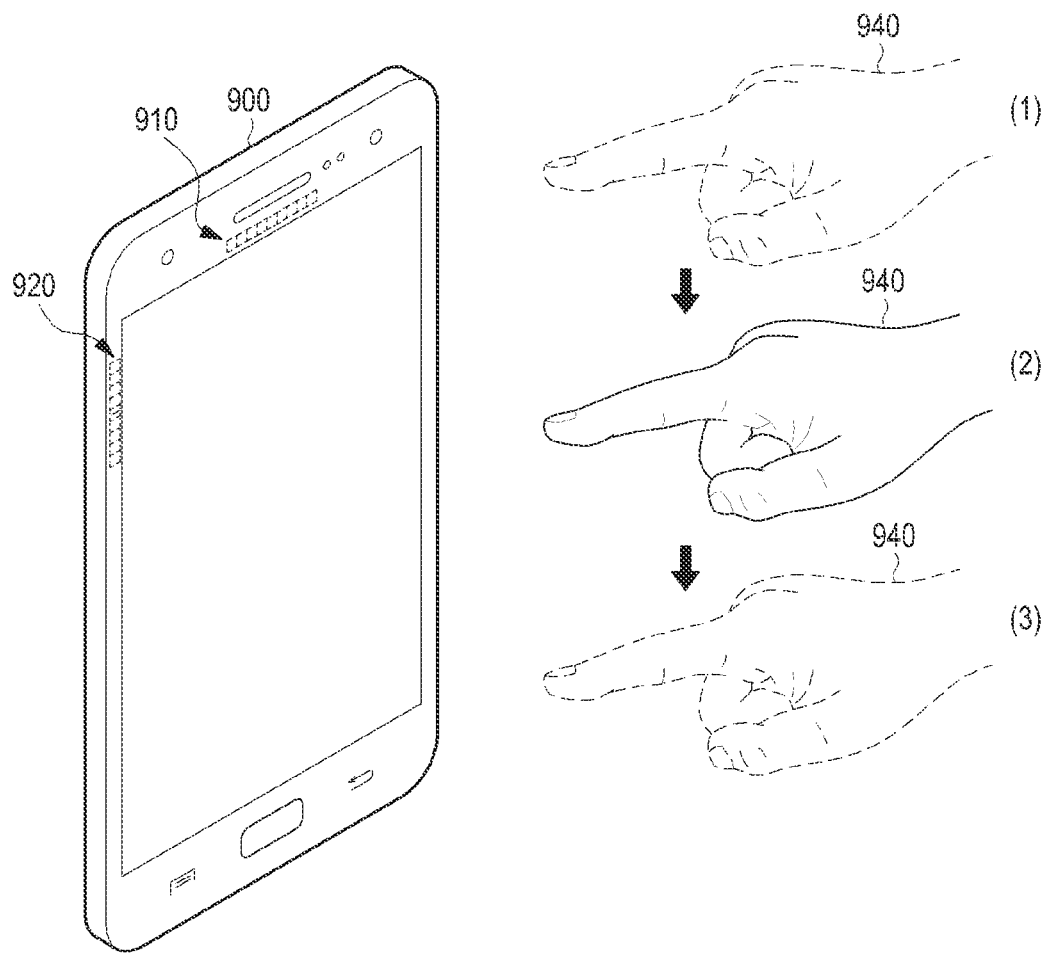

Referring to FIG. 9A, a target object 940 according to an embodiment of the present disclosure may be moving, while opposing (or facing) an electronic device 900. The moving target object 940 generally moves in a certain direction, so it is possible to predict a point to which the target object 940 will move, to perform scanning. For example, the target object 940 is expected to move from top to bottom (e.g., from point (1) to point (2), and then from point (2) to point (3). Therefore, the electronic device 900 according to an embodiment of the present disclosure may set, as a detailed scan area, a point (e.g., point (3)) to which the target object 940 is expected to move, and perform a detailed scan of the detailed scan area. As used herein, the term "detailed scan area" may refer to an area in which a width of an angle at which scanning is performed (e.g., a width of an output transmission beam) is narrow. In contrast, the term "rough scan area" may refer to an area in which a width of an angle at which scanning is performed is wide, compared with the detailed scan area. The width of the output transmission beam may be controlled in inverse proportion to the number of transducers that output transmission beams. Even in a case where a reception beam is received, if the number of transducers included in the receiving-side transducer array is reduced, the range (e.g., the angle), in/at which the reception beam can be detected, can be wide. Thus, it is possible to adjust the scan area by adjusting the number of transducers for detecting the reception beams. For example, it will be assumed that the total scan area is 160° and the detailed scan area is 40°, which is determined by the triangulation method described above with reference to FIGS. 8A to 8E or by the expected location of the target object described above with reference to FIG. 9A. Under this assumption, in the case of detailed scanning, scanning may be performed at intervals of an angle of 5°, using all transducers (e.g., 9 transmitting-side transducers and 9 receiving-side transducers) of the transmitting-side and receiving-side transducer arrays, and in the case of rough scanning (e.g. scanning to a second predetermined level of detail that is less than a first predetermined level of detail), scanning may be performed at intervals of an angle of 20°, using only some transducers (e.g., 3 transmitting-side transducers and 3 receiving-side transducers) included in the transmitting-side and receiving-side transducer arrays. The angles of 5° and 20° and the number of transducers used for scanning are merely examples, and the present disclosure is not limited thereto. In addition, it is not intended that the illustrated angles (e.g., 5° and 20°) are formed according to the number of transducers (in other words, the angles do not depend on the number of transducers). Therefore, in a rough scan area (e.g. 120°), scanning is performed at intervals of, for example, 20°, so the scanning may be performed 6 times (e.g. 120°/20°). In a detailed scan area, the scanning may be performed 8 times (e.g. 40°/5°).

Figure 9B:
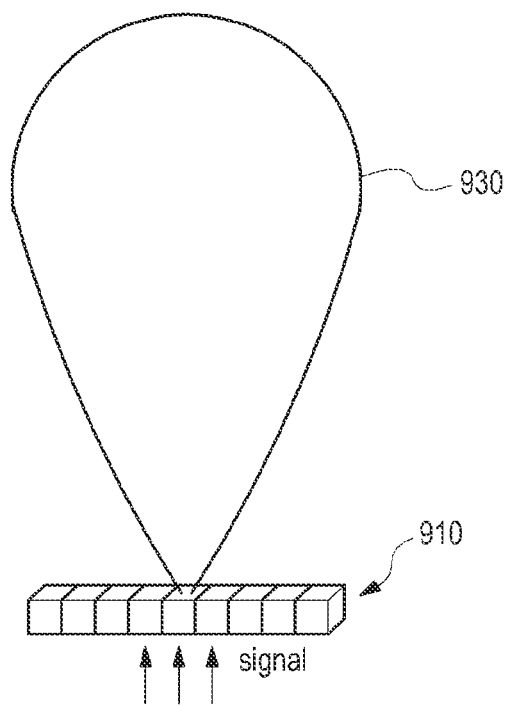
Figure 9C:
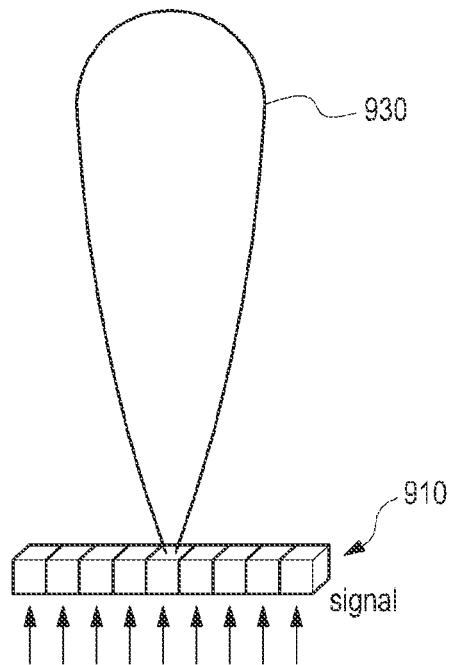
Figure 9E:
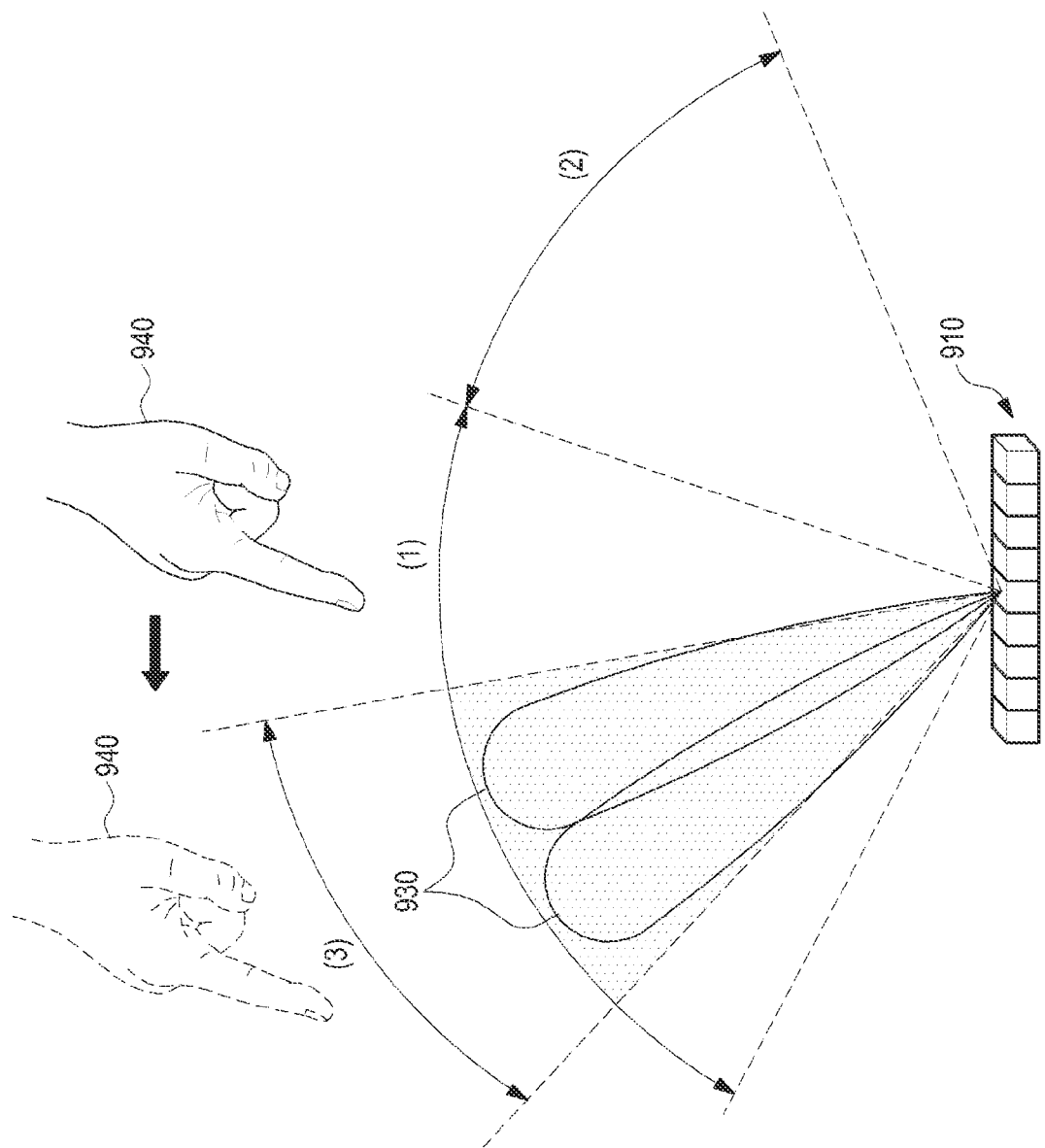

FIGS. 9B and 9C are illustrations of outputting transmission beams 930 in rough scanning and detailed scanning, respectively, according to an embodiment of the present disclosure.

Referring to FIG. 9B, signals (e.g., transmission signals) being input to a first transducer array 910 may be input only to some transducers. Accordingly, the transmission beam 930 output by the first transducer array 910 may have a wide width. In this case, the transmission beam 930 may be used for the rough scanning.

Referring to FIG. 9C, signals (e.g., transmission signals) being input to the first transducer array 910 may be input to a plurality of transducers. Accordingly, the transmission beam 930 formed by the first transducer array 910 may be output as a transmission beam having a narrow width. A transmission beam with a narrow width may be used for detailed scanning.

Referring to FIG. 9D, an expected location of the target object 940 may be determined as, for example, in an area (2), and the area (2) may be set as a detailed scan area by the control module 400 of FIG. 4. The control module 400 may perform detailed scanning for the area (2). The expected location of the target object 940 may be determined using a location prediction algorithm. The location prediction algorithm may include, for example, a Kalman filter, but the present disclosure is not limited thereto. The Kalman filter may indicate a recursive filter for tracking the state of a linear dynamical system in which noise is included.

However, there may be a case that the expected location of the target object 940, which is determined using a location prediction algorithm, is erroneous. For example, though the location of the target object 940, which is expected using the location prediction algorithm, is determined as the area (2), the target object 940, unlike the expectation, may move in the reverse direction of the direction in which the target object 940 has been moving. Accordingly, after detailed scanning the detailed scan area (e.g., the area (2)), if the target object 940 is not in the detailed scan area, the control module 400 may set, as a detailed scan area, an area (e.g., an area (3) in FIG. 9E) in which the existence of the target object 940 is detected, in the rough scan area (e.g., the area (1)), except for the area (2). By separating the detailed scan area (herein "a first scan-type area") and the rough scan area (herein "a second scan-type area") as described above, it is possible to markedly improve scanning speed, compared with the conventional scanning scheme of detailed scanning all areas. For example, in a case where all areas (in a case where a scan area is set as 160°) are scanned in detail, the transmitting-side transducer array 910 may perform scanning 32 times (160°/5°) at intervals of an angle of 5°. As a result, the scanning may be performed a total of 1024 times (e.g. 32 times (by the transmitting-side transducer array)×32 times (by the receiving-side transducer array)). However, in a case where the rough scanning and the detailed scanning are used together as in the present disclosure, the rough scanning may be performed 6 times and the detailed scanning may be performed 8 times as in the above calculation, so the shape of the target object 940 may be determined by scanning a total of 196 times (e.g. 14 times (by the transmitting-side transducer array)×14 times (by the receiving-side transducer array)). If a detailed scan area is re-set to perform re-scanning because a prediction was wrong, the area (3) in which the existence of the target object 940 is detected during rough scanning (e.g., in a case where a range of the area (3) is 40°) has only to be re-scanned at intervals of 5°. Therefore, scanning may be additionally performed a total of 64 times (e.g. 8 times (by the transmitting-side transducer array)×8 times (by the receiving-side transducer array)), so scanning for determining the shape of the target object 940 is only performed a total of 260 times, which is ¼ of 1024 times, resulting in a significant improvement in scanning speed.

Figure 9F:
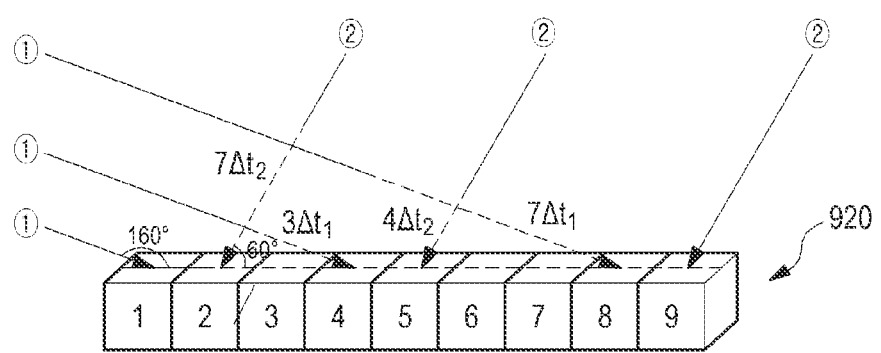

As described above, in a rough scan area (e.g., the area (1)), for rough scanning, the control module 400 may control only some of the transducers in the second transducer array 920 to output a reception signal corresponding to the detection of the reception beam. A direction of a reception beam illustrated in FIG. 9F indicates a direction in which a reception beam is detected, which corresponds to a reception signal whose sum of magnitudes of the overlapped signals exceeds (or is greater than or equal to) a threshold magnitude, among the reception signals having a time delay Δt1. The control module 400 may change the scan direction by differently setting the time delay to Δt2 with respect to other transducers (e.g., a transducer 2, a transducer 5 and a transducer 9) except for the transducers that detect the reception beam (1). In this case, the reception beams received at the second transducer array 920 may be controlled to be detected according to different angles. For example, the scanning speed may be improved by scanning different directions at the same time in such a manner that the transducers 1, 4 and 8 scan a direction of 20° to 90° and the transducers 2, 5 and 9 scan a direction of 90° to 160°. In FIG. 9F, the transducers for detecting the reception beams are indicated as transducers 1, 4 and 8, and transducers 2, 5 and 9, respectively, but the present disclosure is not limited thereto. For example, the transducers for detecting the reception beams may be indicated as adjacent transducers such as transducers 1, 2 and 3, and transducers 4, 5 and 6, respectively.

Even during output of the transmission beam 930 by the transmitting-side transducer array 910, in a case where rough scanning is performed, since some transducers are used, it is possible to output the transmission beam 930 by conceptually dividing the transducer array into, for example, transducers 1, 2 and 3, and transducers 7, 8 and 9. However, where a signal output by the first transducer array 910 includes information indicating from which transducers in the first transducer array 910 the transmission signal was output, the description of FIG. 9F may be applied in the same way. In other words, some of the transducers in the first transducer array 910 may perform scanning at a scan angle of 160°, and the other transducers may perform scanning at a scan angle of 60°, making it possible to improve scanning speed.

Figure 10:
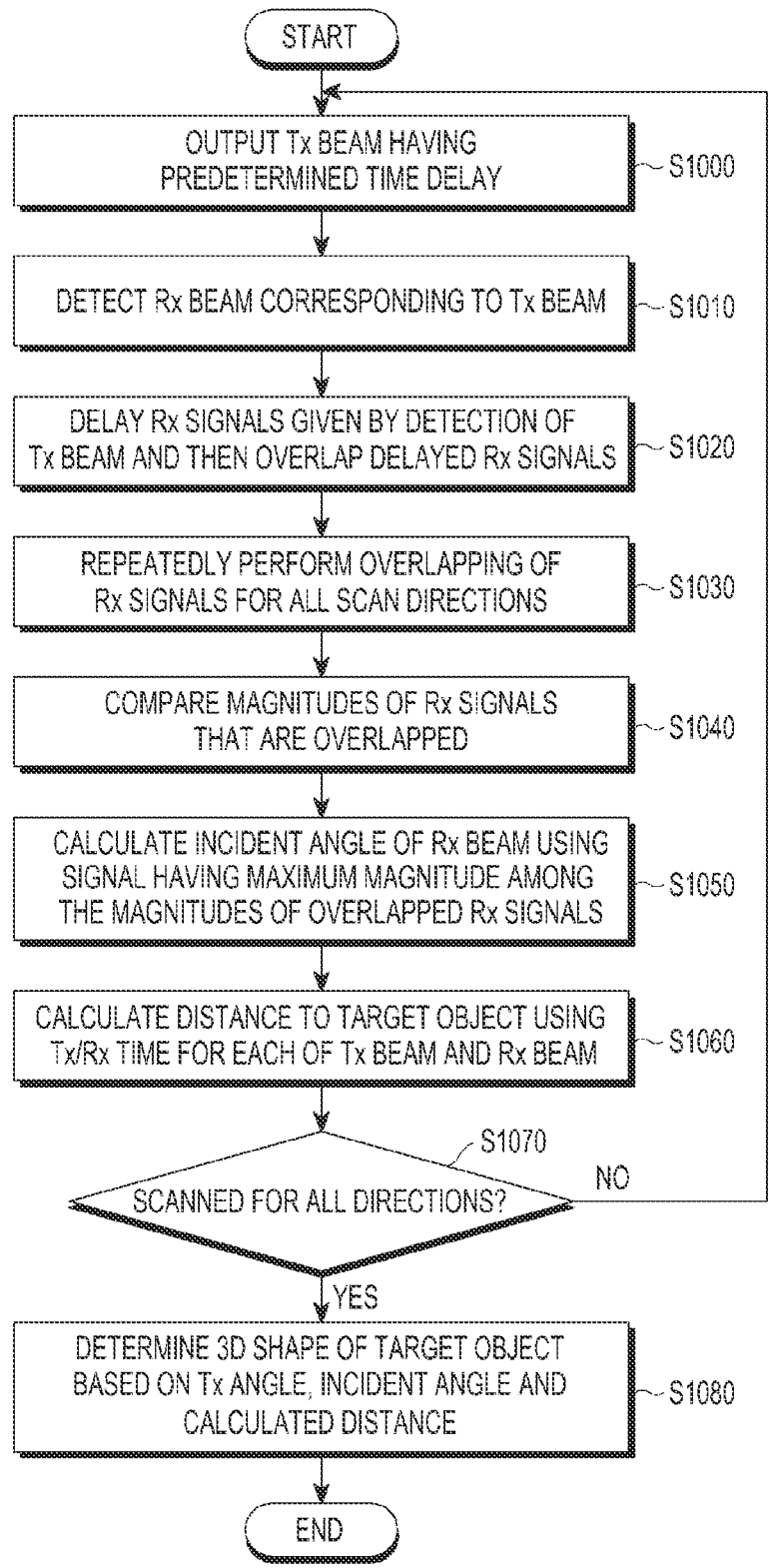
FIG. 10 is a flowchart of a method of scanning a target object in an electronic device including transducer arrays that are spaced apart from each other according to an embodiment of the present disclosure.

FIG. 10 is a flowchart of a method of scanning a target object in an electronic device including transducer arrays that are spaced apart from each other according to an embodiment of the present disclosure.

Referring to FIG. 10, in step S1000, an electronic device according to an embodiment of the present disclosure may output a transmission beam having a predetermined time delay (e.g., a transmission beam being deflected) in order to scan a target object. As described above, the deflected transmission beam may be output according to the transmission signals that are input to their associated transducers according to the time delay. The electronic device may detect a reception beam corresponding to the transmission beam in step S1010, and may delay reception signals caused by the detection of the reception beam (e.g., may compensate for the time delay), and then overlap the delayed signals with each other, in step S1020. According to an embodiment of the present disclosure, the expression "overlapping reception signals" may be used interchangeably with the expression "synthesizing reception signals." The electronic device may overlap reception signals for the reception beam that is detected according to various angles in the scan area.

The electronic device may repeatedly perform an operation of overlapping the delayed signals with respect to all predetermined scan directions, for scanning of the target object in step S1030, and then compare the magnitudes of the overlapped reception signals with a threshold magnitude in step S1040. The magnitudes of the overlapped reception signals may increase or decrease according to the phase change caused by the time delay. In step S1050, the electronic device may calculate an incident angle $4c$ of the reception beam using the signal whose magnitude is the maximum magnitude among the magnitudes of the overlapped signals. The electronic device may determine a direction in which the detected reception beam is detected, based on the calculated incident angle. The electronic device may calculate a time (or a reception time) that is required when the transmission beam arrives at the receiving-side transducer array after being reflected off of the target object, based on a time (or a transmission time) that is required when the transmission beam arrives at the target object, and a time (or a total ToF) in which the transmission beam is detected by the transmitting-side transducer array and the receiving-side transducer array after being reflected off of the target object. As described above, the electronic device may calculate distances D1 and D2 to the target object based on the transmission time and the reception time, in step S1060. Since the electronic device determines a transmission angle θ by changing the time delay when the transmitting-side transducer array outputs the transmission beam, information about the transmission angle θ at which the transmission beam is output may be acquired by the electronic device at the time that the transmission beam is output. In other words, the information about the transmission angle may be determined by the electronic device at the output time of the transmission beam. The electronic device may determine in step S1070 whether the electronic device has output the transmission beam in all directions, i.e., whether the scanning has been performed in all directions of the scan area, and if it is determined that the electronic device has output the transmission beam in all directions, the electronic device may determine a 3D shape of the target object based on the distances D1 and D2, the transmission angle and the incident angle in step S1080.

Figure 11:
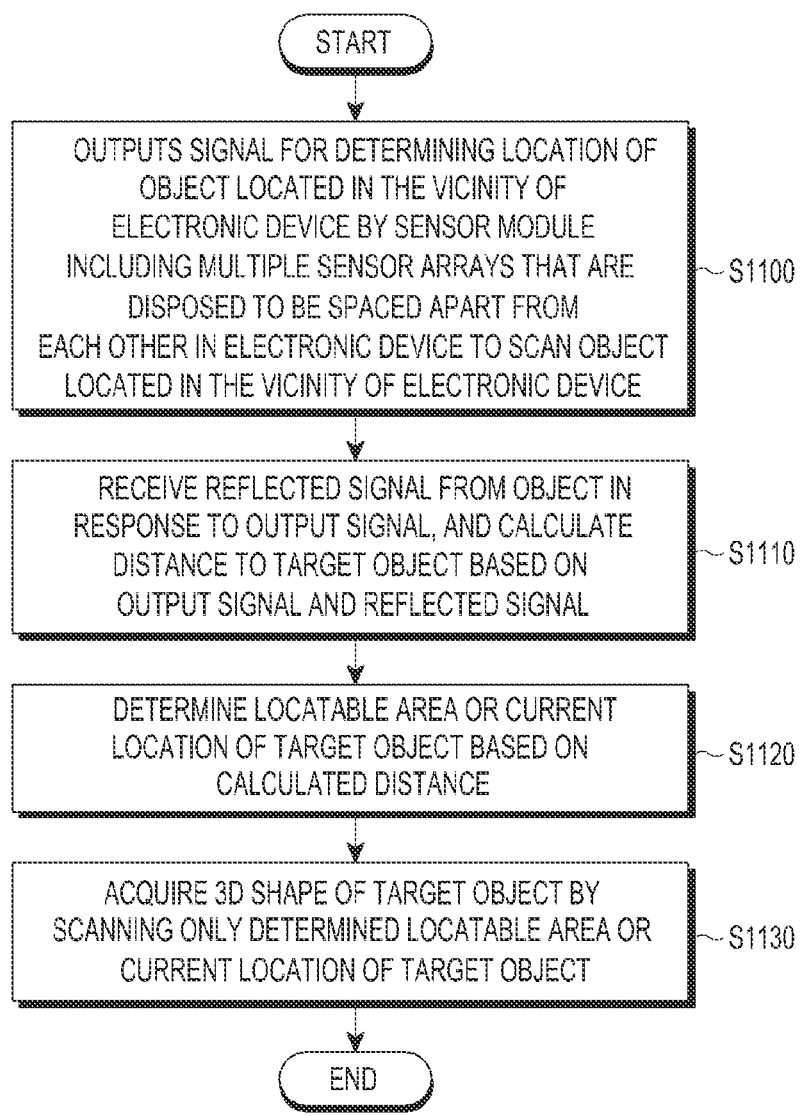
FIG. 11 is a flowchart of a control method of improving scanning speed using triangulation in an electronic device according to an embodiment of the present disclosure.

FIG. 11 is a flowchart of a method of improving scanning speed using triangulation in an electronic device according to an embodiment of the present disclosure.

Referring to FIG. 11, in a control method of an electronic device according to an embodiment of the present disclosure, in order to scan an object located in the predetermined vicinity of the electronic device, a sensor module including a plurality of sensor arrays which are spaced apart from each other in the electronic device may output signals for determining a location of the object located in the predetermined vicinity of the electronic device in step S1100. Since the distance, not the direction, is used to determine the location of the target object, the transmitting-side transducer array may not output the transmission beam for determining a direction of the target object. In addition, the receiving-side transducer array may also not perform scanning for determining the direction in which the target object is located. However, in order to calculate a distance to the target object, any one of the transducers in the transmitting-side transducer array may output a signal (e.g., an ultrasonic signal) for determining the distance in all directions (or at all angles) among the directions pre-determined to scan the object. In the present disclosure, the signal for determining the distance will be referred to as a "third signal." In step S1110, the electronic device may receive reflected signals from the target object in response to the output signals, and calculate a distance to the target object in the transmitting-side transducer array and the receiving-side transducer array based on the output signals and the reflected signals. In step S1120, the electronic device may determine a locatable area or the current location of the target object based on the calculated distance. In step S1110, in order to calculate the distance in the transmitting-side transducer array and the receiving-side transducer array, the transmitting-side transducer array may switch to the reception mode after outputting the signal for determining the distance (in the transmission mode), and then receive the signal being reflected from the target object in the reception mode. Based thereon, the transmitting-side transducer array may calculate the distance to the target object by calculating a round trip time "t" from the transmitting-side transducer array to the target object, and the receiving-side transducer array may calculate the distance from the target object to the receiving-side transducer array, using a difference (T−(t/2)) between the total time T that is required when the signal is received after it is transmitted, and a value (t/2) obtained by dividing the round trip time by 2. In step S1130, the electronic device may acquire a 3D shape of the target object by scanning only the determined locatable area or current location of the target object.

Figure 12:
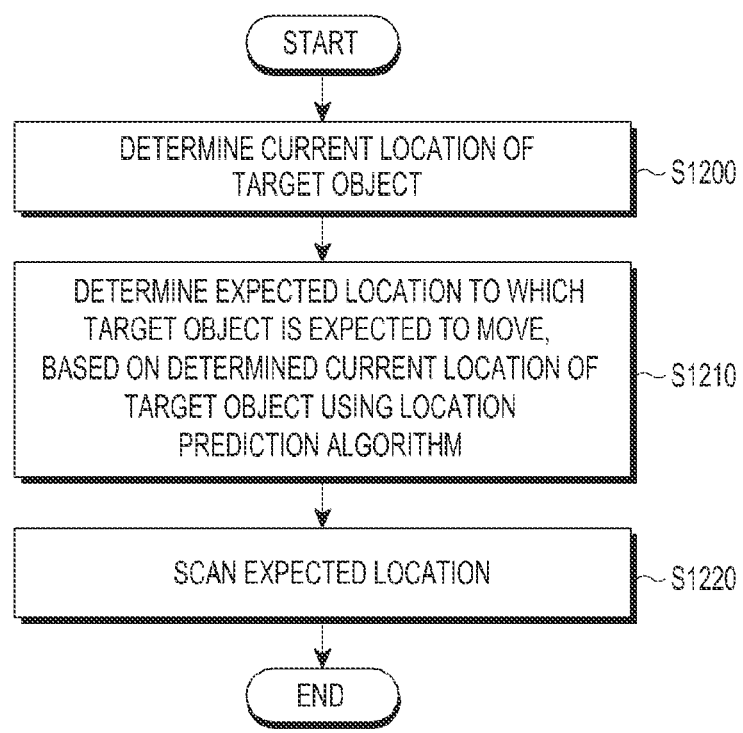
FIG. 12 is a flowchart of a control method of improving scanning speed by predicting an expected location based on a current location of a target object using a location prediction algorithm in an electronic device according to an embodiment of the present disclosure.

FIG. 12 is a flowchart of a control method of improving scanning speed by predicting an expected location based on a current location of a target object using a location prediction algorithm in an electronic device according to an embodiment of the present disclosure.

Referring to FIG. 12, a control method of an electronic device according to another embodiment of the present disclosure may include a step S1200 of determining the current location of the target object, a step S1210 of determining an expected location to which the target object is expected to move, using the location prediction algorithm based on the determined current location of the target object, and a step S1220 of scanning the expected location.

Figure 13:
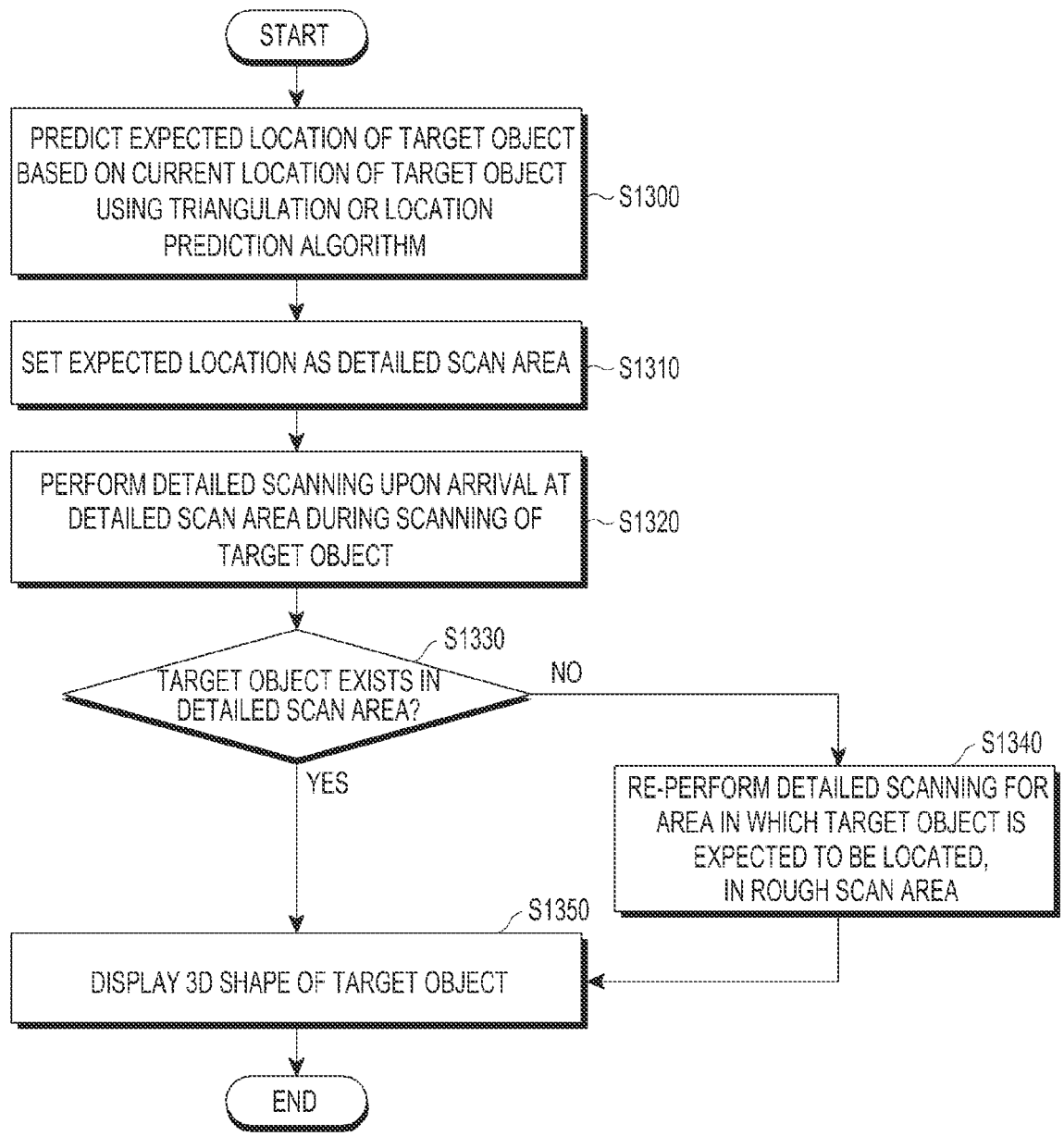
FIG. 13 is a flowchart of a control method of improving scanning speed for a target object through a detailed scan area and a rough scan area determined depending on an expected location of the target object in an electronic device according to an embodiment of the present disclosure.

FIG. 13 is a flowchart of a control method of improving scanning speed for a target object through a detailed scan area and a rough scan area determined depending on an expected location of the target object in an electronic device according to an embodiment of the present disclosure.

Referring to FIG. 13, in step S1300, the electronic device may predict an expected location of the target object based on the current location of the target object using triangulation or a location prediction algorithm such as a Kalman filter. In step S1310, the electronic device may set the expected location as a detailed scan area. In step S1320, the electronic device may scan the target object. For example, the electronic device may perform detailed scanning by reducing the width of the output transmission beam upon arrival at the detailed scan area during the scanning of the target object. The electronic device may determine in step S1330 whether the target object is present in the detailed scan area, i.e., whether the target object is scanned, and if the target object is present in the detailed scan area, the electronic device may display a 3D shape of the scanned target object on its display module in step S1350. If the target object is not present in the detailed scan area, the electronic device may re-perform the detailed scanning for the area in which the target object is expected to be located, in the rough scan area in step S1340, and then perform step S1350. However, according to various embodiments of the present disclosure, step S1340 may be replaced with a step of re-performing the location prediction for the target object with respect to the area which is not scanned in detail, and then perform a detailed scan of the area in which the target object is expected to be located.

In addition to the description above with reference to FIGS. 10 to 13, an electronic device according to an embodiment of the present disclosure may be equally applied to a control method of the electronic device according to an embodiment of the present disclosure.

Each of the above-described components of the electronic device according to an embodiment of the present disclosure may include one or more parts, and the names of the components may vary depending on the type of the electronic device. The electronic device according to an embodiment of the present disclosure may include at least one of the above components, some of which may be omitted, or may further include other additional components. Some of the components of the electronic device according to an embodiment of the present disclosure may be configured as one entity by being combined, so the entity may perform the previous functions of the components in the same way.

As used herein, the term "module" may refer to a unit that includes one of, or a combination of, for example, hardware, software or firmware. The term "module" may be interchangeably used with terms such as, for example, "unit," "logic," "logical block," "component" or "circuit." The term "module" may refer to the minimum unit of a component that is configured as a single body, or a part thereof. The term "module" may refer to the minimum unit that performs one or more functions, or a part thereof. The term "module" may be implemented mechanically or electronically. For example, the term "module" may include at least one of an application-specific integrated circuit (ASIC), a field-programmable gate array (FPGA) or a programmable-logic device, which are known, will be developed in the future, and which may perform any operations.

At least a portion of the device (e.g., modules or their functions) or the method (e.g. steps) according to an embodiment of the present disclosure may be implemented by, for example, a command that is stored in a non-transitory computer-readable storage medium in the form of a programming module. If the command is executed by at least one processor (e.g., the control module 400 of FIG. 4), the at least one processor may perform a function corresponding to the command. The non-transitory computer-readable storage media may be further included, for example, in the electronic device as a memory. At least a portion of the programming module may be implemented (e.g., executed) by, for example, the processor. At least a portion of the programming module may include, for example, a module, a program, a routine, a set of instructions, or a process for performing one or more functions.

The non-transitory computer-readable storage media may include magnetic media (e.g., a hard disk, a floppy disk and magnetic media), optical media (e.g., a compact disc read only memory (CD-ROM) and a digital versatile disc (DVD)), magneto-optical media (e.g., floptical disk)), and a hardware device (e.g., ROM, random access memory (RAM) or flash memory), which is configured to store and execute a program command (e.g., a programming module). In addition, the program command may include not only machine code generated by a compiler, but also high-level language code that can be executed by a computer using an interpreter and the like. The hardware device may be configured to operate as one or more software modules to perform the operations according to an embodiment of the present disclosure, and vice versa.

The module or programming module according to an embodiment of the present disclosure may include at least one of the above-described components, some of which can be omitted, or may further include other additional components. The operations performed by the module, the programming module or other components according to an embodiment of the present disclosure may be performed in a sequential, parallel, iterative or heuristic manner. In addition, some operations may be performed in a different order, or omitted, or other operations may be added.

According to an embodiment of the present disclosure, in a storage medium that stores instructions, when the instructions are executed by at least one processor, the instructions may be set to allow the at least one processor to perform at least one operation. The at least one operation may include an operation in which a sensor module, including a plurality of sensor arrays for scanning an object located in the predetermined vicinity of the electronic device, scans the target object through the output of a directional beam and the detection of a reflected signal. In addition, the at least one operation may include an operation of outputting a signal for determining a location of an object located in the predetermined vicinity of the electronic device to improve the scanning speed for the target object, an operation of receiving a reflected signal from the object in response to the output signal and determining a location of the object based on the output signal and the received signal, and an operation of scanning in detail the object existing in the determined location and roughly scanning the remaining area.

As is apparent from the foregoing description, if transducer arrays according to the related art are disposed in an electronic device such as a smart phone, the arrangement structure is limited by the limited installation area, or the arrangement is impossible. However, even in an electronic device such as a smart phone, which includes a transmitting-side transducer array and a receiving-side transducer array being spaced apart from each other, the transmitting-side transducer array and the receiving-side transducer array may be disposed in various locations in various structures.

According to an embodiment of the present disclosure, in an electronic device in which a transmitting-side transducer array and a receiving-side transducer array are spaced apart from each other, the scanning speed may be improved by recognizing an approximate location through triangulation and adjusting the scan range through the location prediction of the target object.

It is apparent to those of ordinary skill in the art that the effects of the present disclosure are not limited to the effects described above, and various other effects are inherent in the present disclosure.

While the present disclosure has been shown and described with reference to certain embodiments thereof, it will be understood by those skilled in the art that various changes in form and details may be made therein without departing from the scope and spirit of the present disclosure as defined by the appended claims and their equivalents.

What is claimed is:

1. An electronic device, comprising:
a display module including a touch screen;
a sensor module including a first sensor array and a second sensor array for scanning a target object located in a predetermined vicinity of the electronic device wherein the first sensor array extends in a first direction parallel to a first side of the display module and the second sensor array extends in a second direction parallel to a second side of the display module; and
a control module configured to:
output, by the first sensor array, a transmission beam,
determine a location of the target object based on a direction of the transmission beam that is output by the first sensor array extending in the first direction parallel to the first side of the display module and a direction of a reception beam that is received by the second sensor array extending in the second direction parallel to the second side of the display module,
determine an expected movement location of the target object through a location prediction algorithm based on the location of the target object, which is calculated using triangulation, and to set the determined expected movement location as a first scan-type area,
set, as a second scan-type area, another area other than the first scan-type area in a scan range predetermined to scan the target object, perform a scan of the first scan-type area to a first predetermined level of detail, when the target object is not located in the first scan-type area according to a result of the scanning of the first scan-type area, set, as a third scan-type area, a specified area among the second scan-type area, wherein the specified area is an area that the target object is located, perform a scan of the third scan-type area to the first predetermined level of detail, and scan, except for the third scan-type area, the second scan-type area to a second level of detail that is less than the first predetermined level of detail, wherein the direction of the transmission beam is identified based on a transmission angle determined by a time delay of the transmission beam, and wherein the direction of the reception beam is identified based on an incident angle determined by a delay distance of the reception beam and an arrangement distance of the second sensor array extending in the second direction parallel to the second side of the display module, and wherein the first sensor array extending in the first direction parallel to the first side of the display module and the second sensor extending in the second direction parallel to the second side of the display module array are spaced apart from each other.

2. The electronic device of claim 1, wherein the control module is configured to determine a distance from the electronic device to the target object based on a round trip time in which the transmission beam output by the first sensor array arrives at the first sensor array after being reflected off of the target object, and a difference between the round trip time and a time in which the transmission beam output by the first sensor array arrives at the second sensor array.

3. The electronic device of claim 2, wherein the control module is further configured to repeatedly calculate a distance to the target object by changing an output direction of the transmission beam to a predetermined direction.

4. The electronic device of claim 3, wherein the control module is further configured to determine a three-dimensional (3D) shape of the target object based on the calculated distance, the direction of the transmission beam output by the first sensor array, and the direction of the reception beam detected by the second sensor array.

5. The electronic device of claim 1, wherein the control module is further configured to:
calculate a distance to the target object by outputting the transmission beam for determining a distance to the target object by means of the first sensor array; and
determine the location of the target object based on the calculated distance using triangulation.

6. The electronic device of claim 1, wherein the control module is further configured to scan only the first scan-type area.

7. A method of an electronic device, the method comprising:
outputting a transmission beam for determining a location of a target object located in a predetermined vicinity of the electronic device, by a sensor module including a first sensor array and a second sensory array for determining a three-dimensional (3D) shape of the target object located in the predetermined vicinity of the electronic device, wherein the first sensor array that outputs the transmission beam extends in a first direction parallel to a first side of a display module and the second sensor array extends in a second direction parallel to a second side of the display module;

determining a location of the target object based on a direction of the transmission beam that is output by the first sensor array extending in the first direction parallel to the first side of the display module included in the sensor module and a direction of a reception beam received by the second sensor array extending in the second direction parallel to the second side of the display module;

determining at least part of the 3D shape of the target object located in the determined location using the transmission beam and the reception beam;

determining an expected movement location of the target object through a location prediction algorithm based on the location of the target object, which is calculated using triangulation;

setting the determined expected movement location as a first scan-type area;

setting, as a second scan-type area, another area other than the first scan-type area in a scan range predetermined to scan the target object;

performing a scan of the first scan-type area to a first predetermined level of detail;

when the target object is not located in the first scan-type area according to a result of the scanning of the first scan-type area, set, as a third scan-type area, a specified area among the second scan-type area, wherein the specified area is an area that the target object is located;

performing a scan of the third scan-type area to the first predetermined level of detail; and scanning the second scan-type area to a second level of detail that is less than the first predetermined level of detail, wherein the direction of the transmission beam is identified based on a transmission angle determined by a time delay of the transmission beam, and the direction of the reception beam is identified based on an incident angle determined by a delay distance of the reception beam and an arrangement distance of the second sensor array extending in the second direction parallel to the second side of the display module, and wherein the first sensor array extending in the first direction parallel to the first side of the display module and the second sensor array extending in the second direction parallel to the second side of the display module are spaced apart from each other.

8. The method of claim 7, further comprising determining a distance from the electronic device to the target object based on a round trip time in which the transmission beam output by the first sensor array arrives at the first sensor array after being reflected off of the target object, and a difference between the round trip time and a time in which the transmission beam output by the first sensor array arrives at the second sensor array.

9. The method of claim 8, further comprising repeatedly calculating a distance to the target object by changing an output direction of the transmission beam to a predetermined direction.

10. The method of claim 9, wherein determining the 3D shape of the target object located in the determined direction comprises determining the 3D shape of the target object based on the calculated distance, the direction of the transmission beam output by the first sensor array, and the direction of the reception beam detected by the second sensor array.

11. The method of claim 7, further comprising:

calculating a distance to the target object by outputting the transmission beam for determining a distance to the target object by means of the first sensor array; and determining the location of the target object based on the calculated distance using triangulation.

12. The method of claim 7, further comprising scanning only the first scan-type area.

13. A non-transitory computer-readable recording medium storing instructions configured to perform a method by a processor, the method comprising:

outputting a transmission beam for determining a location of a target object located in a predetermined vicinity of an electronic device, by a sensor module including a first sensor array and a second sensor array for determining a three-dimensional (3D) shape of the target object located in the predetermined vicinity of the electronic device, wherein the first sensor array that outputs the transmission beam extends in a first direction parallel to a first side of a display module and the second sensor array extends in a second direction parallel to a second side of the display module;

determining a location of the target object based on a direction of the transmission beam that is output by the first sensor array extending in the first direction parallel to the first side of the display module and a direction of a reception beam received by the second sensor array extending in the second direction parallel to the second side of the display module;

determining at least part of the 3D shape of the target object located in the determined location using the transmission beam and the reception beam;

determining an expected movement location of the target object through a location prediction algorithm based on the location of the target object, which is calculated using triangulation;

setting the determined expected movement location as a first scan-type area;

setting, as a second scan-type area, another area other than the first scan-type area in a scan range predetermined to scan the target object;

performing a scan of the first scan-type area to a first predetermined level of detail, when the target object is not located in the first scan-type area according to a result of the scanning of the first scan-type area, set, as a third scan-type area, a specified area among the second scan-type area, wherein the specified area is an area that the target object is located;

performing a scan of the third scan-type area to the first predetermined level of detail; and scanning the second scan-type area to a second level of detail that is less than the first predetermined level of detail, wherein the direction of the transmission beam is identified based on a transmission angle determined by a time delay of the transmission beam, and the direction of the reception beam is identified based on an incident angle determined by a delay distance of the reception beam and an arrangement distance of the second sensor array extending in the second direction parallel to the second side of the display module, and wherein the first sensor array extending in the first direction parallel to the first side of the display module and the second sensor array extending in the second direction parallel to the second side of the display module are spaced apart from each other.

\* \* \* \* \*